United States Patent
Kim et al.

(10) Patent No.: US 11,184,679 B2
(45) Date of Patent: Nov. 23, 2021

(54) ELECTRONIC APPARATUS AND METHOD FOR CONTROLLING THE ELECTRONIC APPARATUS

(71) Applicant: SAMSUNG ELECTRONICS CO., LTD., Suwon-si (KR)

(72) Inventors: Minsoo Kim, Suwon-si (KR); Taekwon Chang, Suwon-si (KR); Jaehyun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 16/584,017

(22) Filed: Sep. 26, 2019

(65) Prior Publication Data

US 2020/0112771 A1    Apr. 9, 2020

(30) Foreign Application Priority Data

Oct. 8, 2018 (KR) .................. 10-2018-0119946

(51) Int. Cl.
*H04N 21/482* (2011.01)
*H04N 21/466* (2011.01)
(Continued)

(52) U.S. Cl.
CPC ....... *H04N 21/4828* (2013.01); *G06K 9/6267* (2013.01); *G06T 7/70* (2017.01);
(Continued)

(58) Field of Classification Search
CPC ............. H04N 21/4828; H04N 21/435; H04N 21/44008; H04N 21/4662; H04N 21/8405;
(Continued)

(56) References Cited

U.S. PATENT DOCUMENTS 5,708,767 A      1/1998  Yeo et al.
6,492,998 B1 *  12/2002  Kim ..................... G06F 16/745
                                                              715/723
(Continued)

FOREIGN PATENT DOCUMENTS

EP      3 316 586         5/2018
KR   10-2001-0001198      1/2001
(Continued)

OTHER PUBLICATIONS

International Search Report and Written Opinion dated Jan. 17, 2020 in counterpart International Application No. PCT/KR2019/013058.

(Continued)

*Primary Examiner* — Robert J Hance
(74) *Attorney, Agent, or Firm* — Nixon & Vanderhye, P.C.

(57) ABSTRACT

An electronic apparatus and a method for controlling the same are disclosed. The method for controlling an electronic apparatus includes acquiring multimedia content including a plurality of image frames, acquiring information related to the multimedia content, selecting at least one image frame including an object related to the acquired information among objects included in the plurality of image frames, generating description information for the at least one selected image frame based on the acquired information, and acquiring description information for the multimedia content based on the generated description information. Thus, the electronic apparatus may generate description information for more elaborate scene analysis regarding multimedia content.

20 Claims, 16 Drawing Sheets

(51) Int. Cl.
| | |
|---|---|
| *H04N 21/435* | (2011.01) |
| *H04N 21/8405* | (2011.01) |
| *G06K 9/62* | (2006.01) |
| *G06T 7/70* | (2017.01) |
| *H04N 21/44* | (2011.01) |
| *G10L 15/18* | (2013.01) |
| *G10L 15/22* | (2006.01) |

(52) U.S. Cl.
CPC ..... *H04N 21/435* (2013.01); *H04N 21/44008* (2013.01); *H04N 21/4662* (2013.01); *H04N 21/8405* (2013.01); *G10L 15/1815* (2013.01); *G10L 15/22* (2013.01); *G10L 2015/223* (2013.01)

(58) Field of Classification Search
CPC ....... H04N 21/42203; H04N 21/47217; H04N 21/23418; G06K 9/6267; G06K 9/6224; G06K 9/00731; G06K 9/00718; G06K 9/00724; G06K 9/4685; G06K 9/62; G06K 2209/27; G06K 9/00744; G06T 7/70; G10L 15/1815; G10L 15/22; G10L 2015/223
See application file for complete search history.

(56) References Cited

U.S. PATENT DOCUMENTS

| | | | |
|---|---|---|---|
| 7,184,100 B1* | 2/2007 | Wilf ....................... | G11B 27/28 348/700 |
| 9,202,523 B2 | 12/2015 | Ryu et al. | |
| 9,633,264 B2 | 4/2017 | Yano et al. | |
| 9,830,526 B1 | 11/2017 | Lin et al. | |
| 9,942,440 B2 | 4/2018 | Kurzhanskiy et al. | |
| 9,971,792 B2 | 5/2018 | Solli | |
| 10,180,983 B1* | 1/2019 | Lee ................... | H04N 21/4661 |
| 10,187,677 B1* | 1/2019 | Panchaksharaiah .... | G10L 15/18 |
| 2002/0126143 A1 | 9/2002 | Bae et al. | |
| 2012/0017239 A1* | 1/2012 | Ryu ......................... | G11B 27/11 725/32 |
| 2012/0150990 A1* | 6/2012 | Liou ................... | H04N 21/858 709/217 |
| 2014/0285717 A1* | 9/2014 | Cai .................. | H04N 21/23418 348/571 |
| 2018/0232606 A1 | 8/2018 | Park et al. | |

FOREIGN PATENT DOCUMENTS

| | | |
|---|---|---|
| KR | 10-0319160 | 12/2001 |
| KR | 10-0411340 | 12/2003 |
| KR | 10-1485820 | 1/2015 |
| KR | 10-1644789 | 8/2016 |
| KR | 10-2018-0084576 | 7/2018 |
| KR | 10-2018-0105522 | 9/2018 |
| WO | 2010/117213 | 10/2010 |
| WO | 2018/164435 | 9/2018 |

OTHER PUBLICATIONS

Extended European Search Report dated Jul. 22, 2021 in counterpart European Application No. 19870275.5.
Missaoui et al., "Effective Image and Video Mining: an Overview of Model-Based Approaches," Multimedia Data Mining, Aug. 21, 2005, pp. 43-52.

* cited by examiner

ELECTRONIC APPARATUS AND METHOD FOR CONTROLLING THE ELECTRONIC APPARATUS

CROSS-REFERENCE TO RELATED APPLICATION

This application is based on and claims priority under 35 U.S.C. § 119 to Korean Patent Application No. 10-2018-0119946, filed on Oct. 8, 2018, in the Korean Intellectual Property Office, the disclosure of which is incorporated by reference herein in its entirety.

BACKGROUND

Field

The disclosure relates to an electronic apparatus and a method for controlling the same, and for example, to an electronic apparatus for analyzing multimedia content and providing an image related to a user-requested scene, and a method for controlling the same.

Description of Related Art

As communication technologies of electronic apparatuses and user interfaces have advanced, users may readily be provided with necessary information via electronic apparatuses without the constraints of place and time.

For example, an electronic apparatus such as a smart TV may search entire sections of multimedia content for a section suitable for a user intent and selectively output only an image of the searched section, as well as outputting the entire multimedia content requested by a user.

To this end, the related art electronic apparatus performs a scene analysis on a plurality of image frames configuring content using a deep learning-based artificial intelligence model, thereby providing an image of a section including a scene suitable for a user's intent.

However, in the case of using only the deep learning-based artificial intelligence model, a search result for a section including an unsuitable scene against a user intent or a section including an unnecessary scene on multimedia content may be provided.

SUMMARY

Embodiments of the disclosure address the above disadvantages and other disadvantages not described above.

The disclosure provides an electronic apparatus capable of providing description information for more elaborate scene analysis for multimedia content.

The disclosure also provides a sophisticated search result suitable for the user's intent based on provided description information of multimedia content.

According to an example embodiment of the disclosure, a method for controlling an electronic apparatus includes: acquiring multimedia content including a plurality of image frames; acquiring information related to the multimedia content; selecting at least one image frame including an object related to the acquired information among objects included in the plurality of image frames; providing description information for the at least one selected image frame based on the acquired information; and acquiring description information for the multimedia content based on the provided description information.

The information may include at least one of electronic program guide (EPG) information on the multimedia content, web information and social network service (SNS) information related to the multimedia content, and metadata stored in the electronic apparatus in connection with the multimedia content.

The selecting may include: selecting a first image frame among the plurality of image frames based on a first object related to a first keyword among a plurality of keywords included in the information being detected from the first image frame, and selecting at least one image frame including the first object among successive image frames following the first image frame.

The selecting may include: selecting a second image frame based on the first object being detected from a successive second image frame following the first image frame, and selecting the second image frame based on whether a second object related to a second keyword, among the plurality of keywords included in the information, being present in the second image frame based on the first object not being detected from the second image frame.

The providing may include: inputting a keyword included in the information and the first image frame among the at least one selected image frame to an artificial intelligence model for object recognition to provide description information for the first image frame, and inputting a keyword included in the information and a second image frame among the at least one selected image frame to the artificial intelligence model to provide description information for the second image frame.

The description information may be information in a relational graph format representing a plurality of texts describing objects included in the selected image frame.

The acquiring may include: based on there being at least one associated text among a plurality of texts included in the description information for the first image frame and among a plurality of texts included in the description information for the second image frame, combining the at least one associated text to generate a relational graph for the multimedia content.

The method may further include: based on a command regarding the multimedia content being input, comparing text included in the command with a text included in the description information for the multimedia content, generating scene content associated with the command, and outputting the generated scene content.

The selecting of the at least one image frame may include: analyzing each of the plurality of image frames to select an image frame at a time of the occurrence of image transition; determining each of image frames at the time of the occurrence of image transition as a representative frame; determining at least one representative frame including an object related to a keyword included in the information among the plurality of representative frames, as a key frame; and selecting an image frame included in a section including the image frame determined as the key frame.

The section may include the image frame determined as the key frame and an image frame preceding an image frame determined as a representative frame among successive image frames following the image frame determined as the key frame.

According to another example embodiment of the disclosure, an electronic apparatus includes: a processor, the processor configured to control the electronic apparatus to: acquire multimedia content including a plurality of image frames and information related to the multimedia content, select an image frame including an object related to the acquired information among objects included in the plurality of image frames, provide description information for the at least one selected image frame based on the acquired information, and acquire description information for the multimedia content based on the provided description information.

The information may include at least one of EPG information on the multimedia content, web information and SNS information related to the multimedia content, or metadata stored in the electronic apparatus in connection with the multimedia content.

The processor may be configured to control the electronic apparatus to: select a first image frame among the plurality of image frames based on a first object related to a first keyword among a plurality of keywords included in the information being detected from the first image frame, and select at least one image frame including the first object among successive image frames following the first image frame.

The processor may be configured to control the electronic apparatus to: select a second image frame based on the first object being detected from the successive second image frame following the first image frame, and select the second image frame based on a second object related to a second keyword, among the plurality of keywords included in the information, being present in the second image frame based on the first object not being detected from the second image frame.

The processor may be configured to control the electronic apparatus to: input a keyword included in the information and a first image frame among the at least one selected image frame to an artificial intelligence model for object recognition to provide description information for the first image frame, and input a keyword included in the information and a second image frame among the at least one selected image frame to the artificial intelligence model to provide description information for the second image frame.

The description information may be information in a relational graph format representing a plurality of texts describing objects included in the selected image frame.

Based on at least one associated text being present among a plurality of texts included in the description information for the first image frame and among the plurality of texts included in the description information for the second image frame, the processor may be configured to control the electronic apparatus to combine the at least one associated text to generate a relational graph for the multimedia content.

The electronic apparatus may further include: an inputter comprising input circuitry; and an outputter comprising output circuitry, wherein based on a command regarding the multimedia content being input through the inputter, the processor is configured to control the electronic apparatus to compare text included in the command with the text included in the description information for the multimedia content to generate scene content associated with the command and to control the outputter to output the generated scene content.

The processor may be configured to control the electronic apparatus to: analyze each of the plurality of image frames to select an image frame at the time of the occurrence of image transition, determine each of image frames at the time of the occurrence of image transition as a representative frame, determine, as a key frame, at least one representative frame including an object related to a keyword included in the information among the plurality of representative frames, and select an image frame included in a section including the image frame determined as the key frame.

The section may include the image frame determined as the key frame and an image frame preceding an image frame determined as a representative frame among successive image frames following the image frame determined as the key frame.

According to another example embodiment of the disclosure, a non-transitory computer-readable recording medium combined with an electronic apparatus and storing a program for executing operations including: acquiring multimedia content including a plurality of image frames; acquiring information related to the multimedia content; selecting an image frame including an object related to the acquired information among objects included in the plurality of image frames; providing description information for the at least one selected image frame based on the acquired information; and acquiring description information for the multimedia content based on the provided description information.

As described above, according to the disclosure, the electronic apparatus may provide description information for more sophisticated scene analysis with respect to multimedia content. Furthermore, the electronic apparatus according to the disclosure may provide a sophisticated search result suitable for the user's intent based on the description information of the generated multimedia content.

Additional and/or other aspects and advantages of the disclosure will be set forth in part in the description which follows and, in part, will be apparent from the description.

BRIEF DESCRIPTION OF THE DRAWINGS

The above and/or other aspects, features and advantages of certain embodiments of the disclosure will be more apparent from the following detailed description, taken in conjunction with the accompanying drawings, in which.

DETAILED DESCRIPTION

Figure 1:
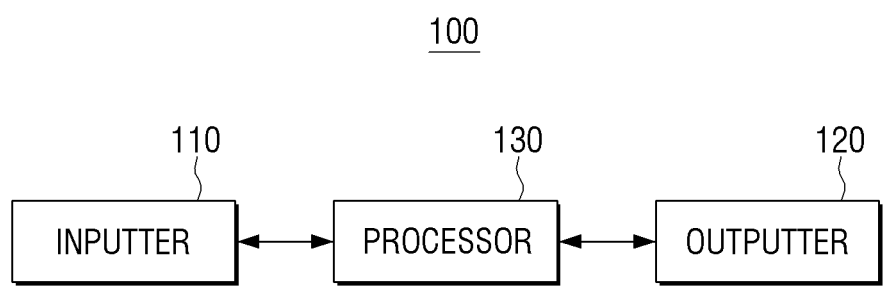
FIG. 1 is a block diagram illustrating an example electronic apparatus according to an embodiment of the disclosure.

Hereinafter, various example embodiments of the disclosure will be described in greater detail with reference to the accompanying drawings. Embodiments and terms used herein are not intended to limit the technologies described in the disclosure to specific embodiments, and it should be understood that the embodiments and the terms include modifications, equivalents, and/or alternatives on the corresponding embodiments described herein. With regard to description of drawings, similar components may be marked by similar reference numerals.

An expression "comprising" or "may comprise" used in the disclosure indicates presence of corresponding characteristics (e.g., components such as numerical value, function, operation, or element) and does not limit additional at least one function, operation, or element.

In the disclosure disclosed herein, the expressions "A or B", "at least one of A or/and B", and "one or more A or/and B" used herein may include any and all combinations of one or more of the associated listed items. For example, "A or B", "at least one of A and B" or "at least one of A or B" may include all the cases of (1) including at least one A, (2) including at least one B, or (3) including at least one A and at least one B.

Expressions such as "first," or "second," and the like, may express their components regardless of their priority or importance and may be used to distinguish one component from another component but is not limited to these components.

When an (e.g., first) element is referred to as being "(operatively or communicatively) coupled with/to" or "connected to" another (e.g., second) element, it may be directly coupled with/to or connected to the other element or an intervening element (e.g., a third element) may be present. However, when it is described that an element (e.g., first) element) is "directly coupled" to another element (e.g., second element), no element (e.g., third element) may exist between the element and the other element.

According to the situation, the expression "configured to" used herein may be interchangeably used as, for example, the expression "suitable for", "having the capacity to", "designed to", "adapted to", "made to", or "capable of". The expression "a device configured to" may refer, for example, to a situation in which the device is "capable of" operating together with another device or other parts. For example, a "sub-processor configured to (or set to) perform A, B, and C" may refer, for example, and without limitation, to a dedicated processor (e.g., an embedded processor) for performing a corresponding operation, a generic-purpose processor (e.g., a central processing unit (CPU) or an application processor), or the like, which performs corresponding operations by executing one or more software programs which are stored in a memory device.

According to various embodiments of the disclosure, an electronic device may include at least one of, for example, and without limitation, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, wearable devices, or the like.

A wearable device may include, for example, and without limitation, at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), a bio-implantable type of a circuit, or the like.

According to an embodiment, the electronic device may include at least one of, for example, and without limitation, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to an embodiment, the electronic devices may include, for example, and without limitation, at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices, etc.), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, drones, automatic teller's machines (ATMs) of banking institutions, points of sales (POSs), internet of things (e.g., light bulbs, various sensors, sprinkler devices, fire alarms, thermostats, street lamps, toasters, exercise equipment, hot water tanks, heaters, boilers, and the like), or the like.

The term "user" used herein may refer, for example, to a person who uses an electronic device or may refer, for example, to a device that uses an electronic device (e.g., an artificial intelligence electronic device).

FIG. 1 is a block diagram illustrating an example electronic apparatus according to an embodiment of the disclosure.

As illustrated in FIG. 1, an electronic apparatus 100 includes an inputter (e.g., including input circuitry) 110, an outputter (e.g., including output circuitry) 120, and a processor (e.g., including processing circuitry) 130.

The inputter 110 may include various input circuitry and receives multimedia content including a plurality of image frames.

The outputter 120 may include various output circuitry and outputs multimedia content input from the outside through the inputter 110 or image and audio data of multimedia content stored in a storage 170 (e.g., to be described below with reference to FIG. 2).

When multimedia content including a plurality of image frames input through the inputter 110 or previously stored are acquired, the processor 130 acquires information related to the multimedia content.

For example, the information related to the multimedia content may include at least one of electronic program guide (EPG) information on multimedia content, web information and social network service (SNS) information related to multimedia content, and meta data stored in the electronic apparatus 100 in connection with the multimedia content.

When the multimedia content and the information related to the multimedia content are acquired, the processor 130 may select at least one of a plurality of image frames.

The processor 130 may generate (provide) description information for at least one selected image frame based on the acquired information in connection with the multimedia content.

The processor 130 may acquire description information for the multimedia content based on the description information generated (provided) in connection with the at least one image frame.

The description information may, for example, be information in a relational graph format representing a plurality of texts describing an object included in an image frame.

The processor 130 may include various processing circuitry and select at least one of the plurality of image frames configuring the multimedia content through the following embodiments.

According to an embodiment, the processor 130 may select at least one image frame including an object related to the information acquired in connection with the corresponding multimedia content among objects included in the plurality of image frames configuring the multimedia content.

For example, when a first object related to a first keyword among keywords included in the acquired information is detected from the first image frame among the plurality of image frames configuring the multimedia content, the processor 130 may select the first image frame.

For example, the processor 130 may determine whether the first object related to the first keyword among the keywords included in the information acquired in connection with the multimedia content is present in the first image frame using an object recognition algorithm. The object recognition algorithm may be a known art, and thus, a detailed description thereof will not be provided here.

If it is determined that the first object related to the first keyword is present in the first image frame, the processor 130 may track objects included in successive image frames following the first image frame and select at least one image frame including the first object.

For example, the processor 130 may track objects included in a successive second image frame following the first image frame including the first object related to the first keyword and may determine whether the first object is present. If it is determined that the first object is detected from the second image frame, the processor 130 selects the second image frame.

If, however, the first object is not detected from the second image frame, the processor 130 may select the second image frame depending on whether a second object related to a second keyword, among the keywords included in the acquired information is present in the second image frame.

The processor 130 may input the keyword included in the first image frame among the at least one previously selected image frame and the acquired information to an artificial intelligence model for object recognition to generate description information for the first image frame.

The processor 130 may input the keyword included in the second image frame among the at least one previously selected image frame and the acquired information to the artificial intelligence model to generate description information for the second image frame.

As described above, the description information may, for example, be information in a relational graph format representing a plurality of texts describing objects included in the image frame.

As described above, when the description information for the first and second image frames of the at least one previously selected image frame is generated, the processor 130 may generate a relational graph for the multimedia content based on the text included in each description information.

For example, when there is at least one associated text among a plurality of texts included in the description information for the first image frame and a plurality of texts included in the description information for the second image frame, the processor 130 may combine the at least one associated text to generate a relational graph for the multimedia content and acquire the generated relational graph as description information for the multimedia content.

According to another embodiment, the processor 130 may analyze each of the plurality of image frames configuring the multimedia content and may select an image frame at a time when an image transition has occurred.

For example, the processor 130 may analyze an image transition of the acquired multimedia content using an image transition analysis algorithm and may determine a plurality of representative frames for each of the plurality of sections.

For example, the processor 130 may use an image transition analysis algorithm which determines whether an image transition has occurred by comparing pixel values of a plurality of image frames configuring the multimedia content. However, the disclosure is not limited thereto, and the processor 130 may determine whether an image transition has occurred using various known image transition analysis algorithms.

The processor 130 may determine each of the image frames at the time of the occurrence of image transition as a representative frame. The processor 130 may determine at least one representative frame including an object related to a keyword included in the acquired information in connection with the corresponding multimedia content, among the plurality of predetermined representative frames, as a key frame and select an image frame included in a section including the image frame determined as the key frame.

The section may include an image frame preceding an image frame determined as a representative frame, among the image frame determined as the key frame and a successive image frame subsequent to the image frame determined as the key frame.

When a plurality of representative frames are determined for each of the plurality of sections, the processor 130 may determine at least one representative frame among the plurality of representative frames as a key frame based on the keyword included in the information acquired in connection with the multimedia content.

The key frame may be an image frame including an object matched to the keyword included in the acquired information in connection with the multimedia content among the plurality of representative frames.

As described above, the processor 130 may select at least one representative frame including the object associated with the keyword included in the acquired information in connection with the multimedia content among the plurality of representative frames using the object recognition algorithm, and determine the at least one selected representative frame as a key frame.

When the key frame corresponding to the at least one of the plurality of sections configuring the multimedia content is determined, the processor 130 may generate description information for the at least one section including an image frame corresponding to the key frame through the following embodiment.

According to an embodiment of the disclosure, the processor 130 may input each of image frames included in a first section among at least one section including the image frame corresponding to the key frame and the keyword included in the acquired information into an artificial intelligence model for object recognition to generate description information for each of the image frames included in the first section. The processor 130 may combine the description information for each of the image frames included in the first section to acquire description information of the first section.

Similarly, the processor 130 may input each of image frames included in a second section among at least one section including the image frame corresponding to the key frame and the keyword included in the acquired information into an artificial intelligence model for object recognition to generate description information for each of the image frames included in the second section. The processor 130 may combine the description information for each of the image frames included in the second section to acquire description information of the second section.

As described above, the description information may, for example, be information in a relational graph format indicating a plurality of texts describing the objects included in the image frame.

When the description information of the first and second sections is acquired through the embodiment described above, the processor 130 may acquire description information for the multimedia content based on the acquired description information of the first and second sections.

For example, when there is at least one associated text in a plurality of texts included in the description information of the first section and in a plurality of texts included in the description information of the second section, the processor 130 may combine the at least one associated text to generate a relational graph on the multimedia content. Therefore, the processor 130 may acquire the relational graph on the multimedia content generated based on the description information of the first and second sections as description information of the corresponding multimedia content. In a state in which the description information for the multimedia content is generated through the various embodiments described above, when a command (e.g., a user command) regarding the corresponding multimedia content is input, the processor 130 may generate scene content associated with the user command based on the description information for the corresponding multimedia content.

For example, when the command is input, the processor 130 may compare text included in the description information for the multimedia content corresponding to the input command with text included in the command and generate scene content associated with the command. The processor 130 may control the outputter 120 to output the generated scene content. Accordingly, the outputter 120 may output the scene content generated in connection with the user command as at least one of image and audio data.

Hereinafter, a more detailed configuration of the electronic apparatus 100 according to the disclosure will be described in greater detail.

Figure 2:
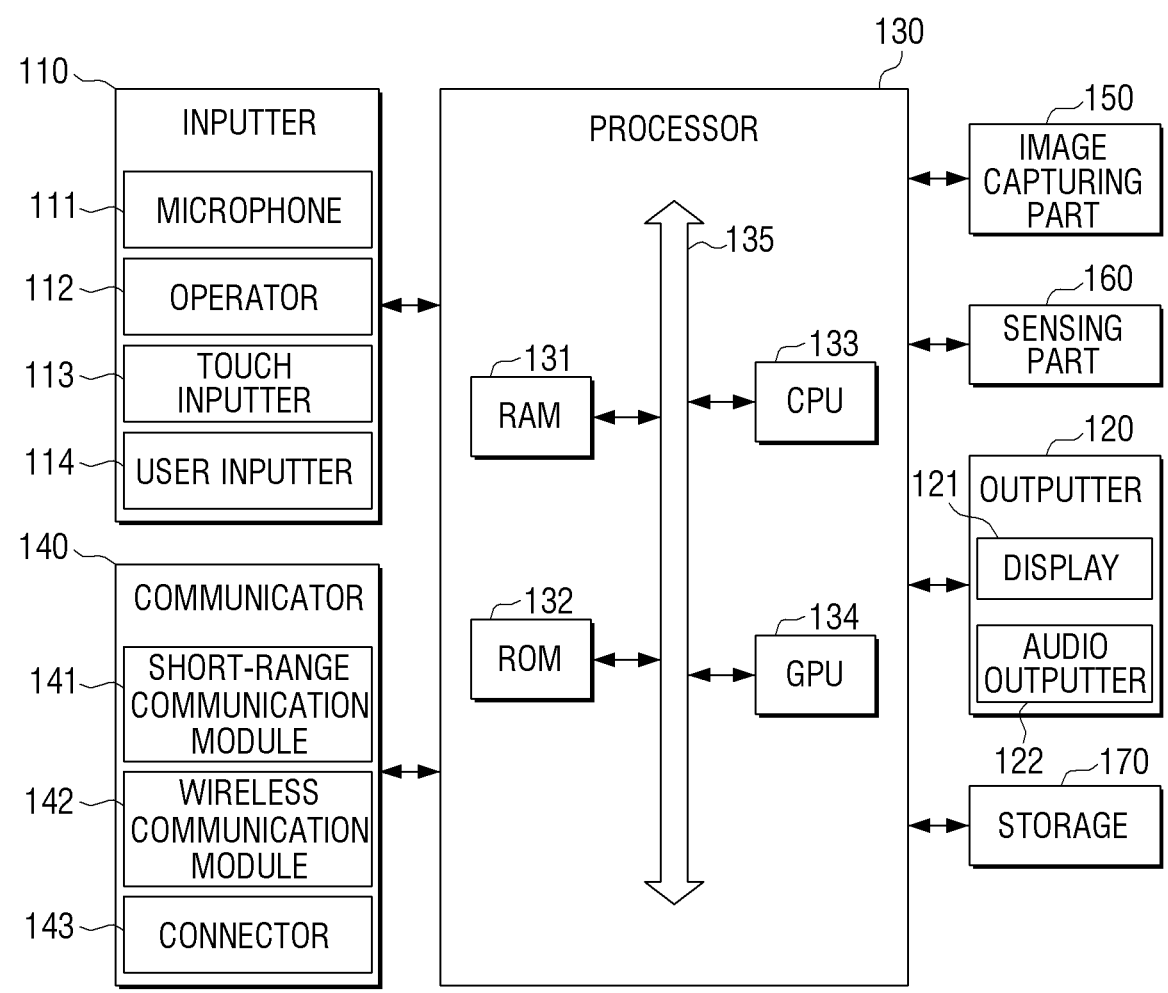
FIG. 2 is a block diagram illustrating an example configuration of an electronic apparatus according to an embodiment of the disclosure.

FIG. 2 is a block diagram illustrating an example configuration of an example electronic apparatus according to an embodiment of the disclosure.

The electronic apparatus 100 may be various smart devices such as, for example, and without limitation, a smart TV, a smartphone, a tablet PC, and the like.

The inputter 110 may include various input circuitry and receive a plurality of image frames configuring the multimedia content and may receive various user commands and transfer the received various user commands to the processor 130.

The inputter 110 may include various input circuitry including, for example, and without limitation, a microphone 111, an operator 112, a touch inputter 113, and/or a user inputter 114, or the like.

The microphone 111 may receive a voice command of the user, and the operator 112 may include various circuitry, such as, for example, and without limitation, a keypad having various function keys, numeric keys, special keys, character keys, and the like.

The touch inputter 113 may, for example, be realized as a touch pad forming an interlayer structure with a display 121 when the display 121 (to be described later) is realized as a touch screen. In this example, the touch inputter 113 may receive a selection command for various application-related icons displayed through the display 121.

The user inputter 114 may include various user input circuitry and receive, for example, and without limitation, an IR signal, an RF signal, or the like, for controlling the operation of the electronic apparatus 100 from at least one peripheral device (not shown) such as a remote control device.

The outputter 120 may include various output circuitry including, for example, and without limitation, a display 121 and an audio outputter 122.

The display 121 outputs image data of multimedia content processed by an image processor (not shown). In addition, the display 121 may display an execution screen including an icon for executing each of a plurality of applications stored in the storage 170 (to be described later) or various UI screens for controlling the operation of the electronic apparatus 100.

The display 121 may be implemented as, for example, and without limitation, a liquid crystal display (LCD), an organic light emitting diode (OLED), or the like.

In addition, the display 121 may be coupled to at least one of a front area and a side area, or a rear area of the electronic apparatus 100 in the form of a flexible display.

The flexible display may be bent, curved, or rolled or twist without damage through a thin, flexible substrate such as paper. Such a flexible display may be manufactured using a plastic substrate as well as a commonly used glass substrate. In case of using a plastic substrate, the plastic substrate may be formed using a processor manufactured at a low temperature, rather than a conventional manufacturing processor, to prevent and/or reduce damage to the substrate. Further, flexibility of folding and unfolding may be imparted by replacing a glass substrate wrapping flexible liquid crystal with a plastic film. Such a flexible display is thin, light, and resistant to impact and may be manufactured in various forms of being bent or curved.

The audio outputter 122 may include various audio output circuitry and outputs audio data of the multimedia content. For example, the audio outputter 122 may be a component outputting various kinds of notification sounds or voice messages, as well as various audio data undergone various processing operations such as, for example, and without limitation, decoding, amplification, and noise filtering, or the like, by an audio processor. For example, the audio outputter 122 may be implemented as, for example, a speaker, but speaker is merely an example and the audio outputter 122 may be realized as an output terminal capable of outputting audio data.

As illustrated in FIG. 2, the electronic apparatus 100 may further include a communicator (e.g., including communication circuitry) 140, an image capturing part (e.g., including image capturing circuitry) 150, a sensing part (e.g., including sensing circuitry, e.g., a sensor) 160 and a storage 170 in addition to the components including the inputter 210, the outputter 120, and the processor 130.

The communicator 140 may include various communication circuitry and may perform data communication with a peripheral device (not shown) such as, for example, and without limitation, a smart TV, a smartphone, and a tablet PC, a content server (not shown), or the like. For example, when an artificial intelligence model is stored in an artificial intelligence server 200 (see, e.g., FIG. 5), the communicator 140 may receive scene content associated with the user command from the artificial intelligence server 200.

The communicator 140 may include various communication circuitry included in various communication modules, such as, for example, and without limitation, a wireless communication module 142, a short-range communication module 141 and a wired communication module including a connector 143 such as, for example, and without limitation, a high-definition multimedia interface (HDMI), a universal serial bus (USB), an IEEE (Institute of Electrical and Electronics Engineers) 1394, and the like.

The short-range communication module 141 may be a component including circuitry for wirelessly performing short-range communication with a peripheral device, the artificial intelligence server 200, and the like, located within a short range of the electronic apparatus 100. The short-range communication module 141 may include various modules including various communication circuitry, such as, for example, and without limitation, at least one of a Bluetooth module, an infrared data association (IrDA) module, a near-field communication (NFC) module, a Wi-Fi module, a Zigbee module, or the like.

The wireless communication module 142 may be a module including various communication circuitry which is connected to an external network and performs communication according to a wireless communication protocol such as IEEE. In addition, the wireless communication module further may include a mobile communication module for performing communication by accessing a mobile communication network according to various mobile communication standards such as, for example, and without limitation, 3rd generation (3G), 3rd generation partnership project (3GPP), long term evolution (LTE), and the like.

As described above, the communicator 140 may be realized by the various short-range communication methods described above and may employ other communication technologies not mentioned in this disclosure as necessary.

A connector 143 may be a component for providing an interface with various source devices such as, for example, and without limitation, USB 2.0, USB 3.0, HDMI, and IEEE 1394. Such a connector 143 may receive multimedia content-related data transmitted from a content server (not shown) or transmit stored multimedia content-related data to an external recording medium through a wired cable connected to the connector 143 according to a control command from the processor 130. Further, the connector 143 may receive power from a power source through a wired cable physically connected to the connector 143.

The image capturing part 150 may include various image capturing circuitry, such as a camera that images an external environment of the electronic apparatus 100. In this example, the image capturing part 150 may include a lens (not shown) through which an image is transmitted and an image sensor (not shown) that senses an image transmitted through the lens. The image sensor (image) may be realized, for example, and without limitation, as a CCD image sensor, a CMOS image sensor, or the like. Image data acquired through the image capturing part 150 may be processed by an image processor (not shown).

The sensing part 160 may include various sensing circuitry (e.g., a sensor) and may sense, for example, a motion of the electronic apparatus 100. The sensing part 160 may include, for example, and without limitation, an accelerometer sensor, a magnetic sensor, a gyro sensor, and the like, and may sense the motion of the electronic apparatus 100 using various sensors.

The accelerometer sensor, is a sensor for measuring acceleration or impact strength of the electronic apparatus 100 which moves, is essentially used in a control system of various transportation means such as automobiles, trains, airplanes, and the like, and robots or the like, as well as in electronic apparatuses such as smartphones and tablet PCs.

The magnetic sensor is an electronic compass that may detect an azimuth using a geomagnetic field. The magnetic sensor is used for location tracking, 3D video game, etc., or used in a smartphone, a radio set, GPS, PDA, navigation device.

The gyroscope sensor is a sensor formed by applying rotation to an existing accelerometer sensor to recognize 6-axis directions to recognize a more detailed and precise operation.

The storage 170 may store multimedia content and description information for the multimedia content as described above. In addition, the storage 170 may store various modules for generating description information for multimedia content.

The storage 170 may further store an operation program for controlling the operation of the electronic apparatus 100.

The operation program may be read from and compiled in the storage 170 and operate each component of the electronic apparatus 100 when the electronic apparatus 100 is turned on. The storage 170 may be realized as at least one of a ROM 132, a RAM 133, a memory card (such as an SD card or a memory stick) detachably attached to the electronic apparatus 100, a non-volatile memory, a volatile memory, a hard disk drive (HDD), or a solid state drive (SSD).

The processor 130 may include various processing circuitry and be a processing device that generally controls the operation of the electronic apparatus 100 or controls an overall operation of the electronic apparatus 100.

Such a processor 130 may include, for example, and without limitation, a RAM 131, a ROM 132, a CPU 133 and a GPU 134, and the RAM 131, the ROM 132, the CPU 133, and the GPU 134 may be interconnected via a bus 135.

The CPU 131 may access the storage 170 and may perform booting using an OS stored in the storage 170. Further, the CPU 131 may perform various operations using various programs, content, data, and the like stored in the storage 170.

The GPU 134 may generate a display screen including various objects such as icons, images, text, and the like. Specifically, the GPU 134 may compute an attribute values such as a coordinate value, a shape, a size, a color, and the like for displaying each object according to a layout of the screen based on a received control command, and generates a display screen of various layouts including the objects.

The ROM 132 may store a command set and the like for booting the system. When a turn-on command is input and power is supplied, the CPU 131 duplicates the OS stored in the storage 170 to the RAM 133 according to an instruction stored in the ROM 132 and executes the OS to boot the system. When the booting is completed, the CPU 131 may duplicate various programs stored in the storage 170 to the RAM 133 and may execute the program duplicated to the RAM 133 to perform various operations.

The processor 130 may be realized as a system-on-a-chip (SOC) (or a system-on-chip (SoC)) in combination with each of the components described above.

Figure 3:
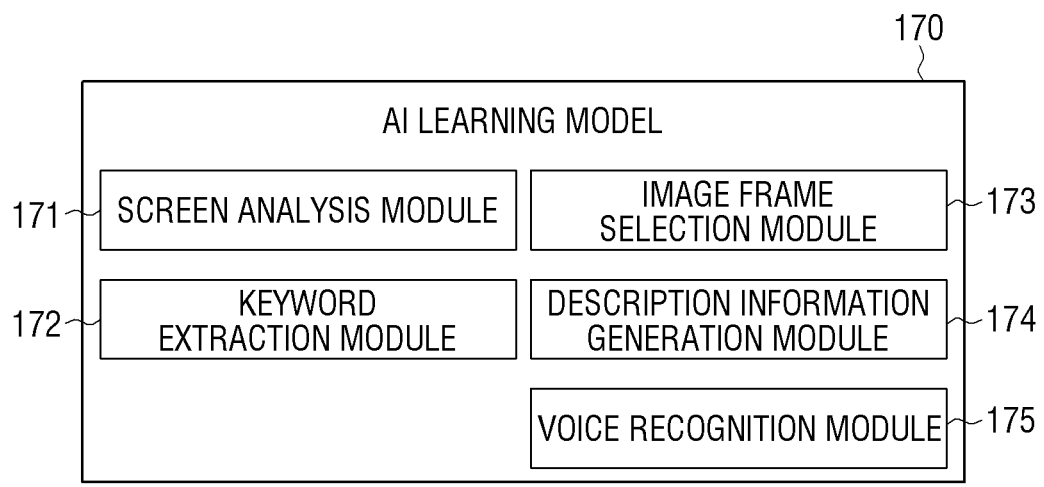
FIG. 3 is a block diagram illustrating an example storage storing various modules for generating description information for multimedia content according to an embodiment of the disclosure.

FIG. 3 is a block diagram illustrating an example storage which stores various modules for generating description information for multimedia content according to an embodiment of the disclosure.

As illustrated in FIG. 3, the storage 170 may include a screen analysis module (e.g., including executable program elements) 171, a keyword extraction module (e.g., including executable program elements) 172, an image frame selection module (e.g., including executable program elements) 173, a description information generation module (e.g., including executable program elements) 174, and a voice recognition module (e.g., including executable program elements) 175.

The keyword extraction module 172 may include various executable program elements in a module for extracting a keyword included in information related to multimedia content. The information related to the multimedia content may include at least one of EPG information on the multimedia content, web information and SNS information related to the multimedia content, and metadata stored in the electronic apparatus 100 in connection with the multimedia content.

For example, the keyword extraction module 172 may extract a keyword as a core by analyzing text included in the EPG information on the multimedia content, the text included in the web information and the SNS related to the multimedia content, and the text included in the meta data stored in the electronic apparatus 100 in connection with the multimedia content.

The image frame selection module 173 may include various executable program elements in a module for selecting an image frame including an object associated with the keyword extracted through the keyword extraction module 172 among a plurality of image frames configuring the multimedia content.

The description information generation module 174 may include various executable program elements in a module for generating description information for each of at least one image frame selected through the image frame selection module 173 and acquires the entire description information for the multimedia content based on the generated description information.

For example, the description information generation module 174 may generate description information for each of at least one selected image frame by inputting the keyword extracted from the at least one selected image frame and the information related to the multimedia content to an artificial intelligence model for object recognition.

If there is at least one associated text among the plurality of texts included in the description information for each of the at least one image frame, the description information generation module 174 combines the at least one associated text to acquire description information representing a relational graph for the multimedia content. The screen analysis module 171 is a module for analyzing the plurality of image frames configuring the multimedia content and selecting an image frame at a time when an image transition occurs.

For example, the screen analysis module 171 may include various executable program elements in a module for determining an image frame at a time when an image transition occurs among the plurality of image frames using an image transition analysis algorithm, and determines the determined image frame as a representative frame.

When at least one representative frame is determined from the plurality of image frames configuring the multimedia content, the screen analysis module 171 may classify the at least one determined representative frame and the image frame associated with the at least one representative frame, as the same section.

For example, when at least one image frame among the plurality of image frames configuring the content is determined as a representative frame, the screen analysis module 171 may determine a section from a first representative frame among the determined representative frames to an image frame preceding to a second representative frame among successive image frames after the first representative frame, as the same section.

In this example, the image frame determination module 173 may determine at least one representative frame among the representative frames determined from the plurality of image frames configuring the multimedia content as a key frame through the screen analysis module 171.

For example, the image frame determination module 173 may determine a representative frame associated with the keyword extracted through the keyword extraction module 172 among the at least one determined representative frame as a key frame.

For example, three representative frames (hereinafter, referred to as first to third representative frames) may be determined from the multimedia content, and a keyword of 'xxx' may be extracted in connection with the corresponding multimedia content. In this example, the image frame determination module 173 may determine a representative frame associated with the keyword 'xxx' among the determined first to third representative frames as a key frame.

When the key frame is determined through the image frame determination module 173, the summary information generation module 174 may generate description information for each of the image frames included in the section including the representative frame determined as the key frame, and generate description information for the entire multimedia content based on the generated description information.

For example, the first and second sections of the plurality of sections configuring the multimedia content may include the representative frame determined as a key frame.

In this example, the multimedia information generation module 174 inputs the keyword extracted in connection with the multimedia content and each of the image frames included in the first section into the artificial intelligence model for object recognition, and acquires description information for each frame included in the first section.

In addition, the description information generation module 174 may input the keyword extracted in connection with the corresponding multimedia content and each of the image frames included in the second section to the artificial intelligence model for object recognition, and acquires description information for each frame included in the second section.

The description information generation module 174 may generate description information for the corresponding multimedia content by combining the description information for each of the image frames included in the first and second sections.

For example, if there is at least one associated text among the plurality of texts included in the summary information for each image frame included in the first section and the plurality of texts included in the summary information for each image frame included in the second section, the description information generation module 174 may combine the at least one associated text to generate description information representing a relational graph regarding the corresponding multimedia content.

When a command (e.g., a user command) is input through the inputter 110, the voice recognition module 175, which may include various executable program element in a module, may translate the input user command into a language recognizable by the electronic apparatus 100.

The user command may be a voice command uttered by the user.

Accordingly, when the user's uttered voice command is input, the voice recognition module 175 may translate the uttered voice command input into text using, for example, a speech-to-text (STT) algorithm and may analyze the uttered voice translated into text to grasp an intent of the user utterance.

The operation of recognizing such a user uttered voice will be described in greater detail below.

As described above, the processor 130 may generate the description information for the acquired multimedia content using various modules stored in the storage 170, and when a user command is input, the processor 130 may recognize the user command and control the outputter 120 to output scene content related to the user command from the generated description information for the multimedia content.

Hereinafter, a method for generating description information for multimedia content and providing scene content related to a user command based on the generated description information for the multimedia content in the electronic apparatus 100 according to the disclosure will be described.

Figure 4:
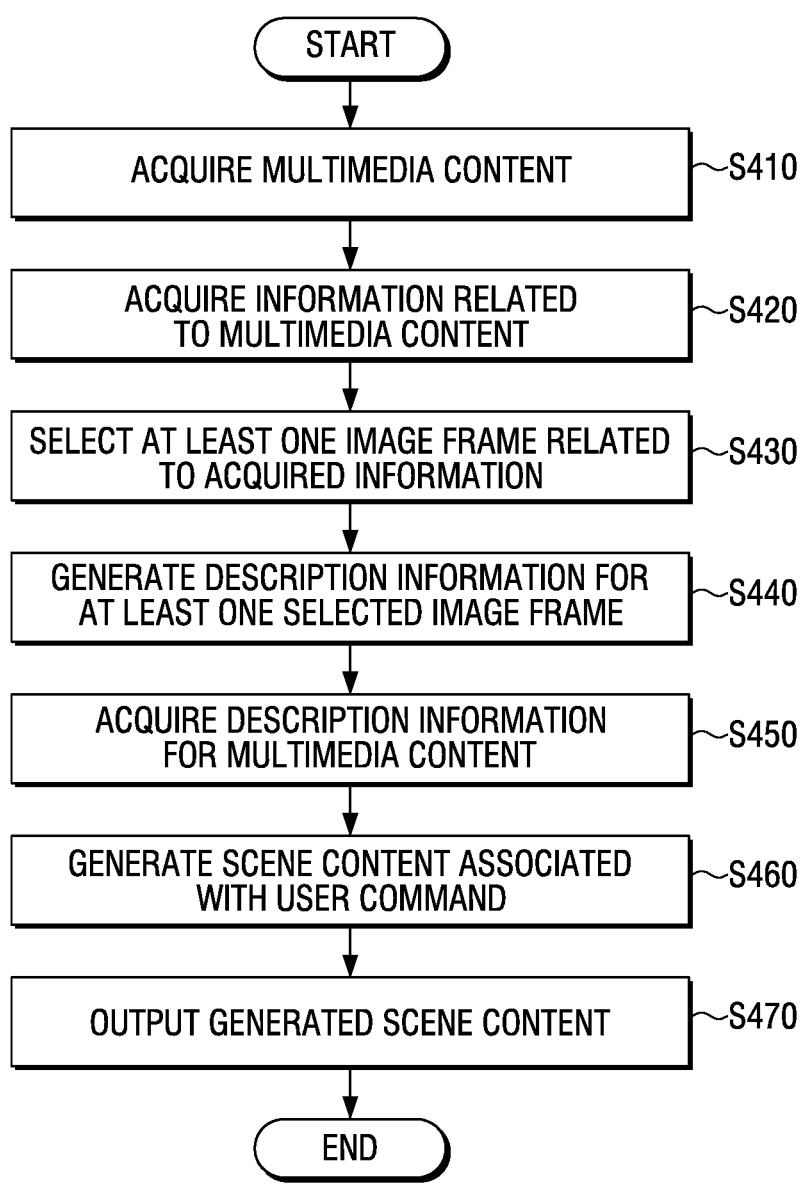
FIG. 4 is a flowchart illustrating an example method of providing scene content associated with a user command in an electronic apparatus according to an embodiment of the disclosure.

FIG. 4 is a flowchart illustrating an example method for providing scene content associated with a user command in an electronic apparatus according to an embodiment of the disclosure.

As illustrated in FIG. 4, the electronic apparatus 100 may acquire multimedia content including a plurality of image frames and information related to the multimedia content (S410 and S 420).

The information related to the multimedia content may include at least one of electronic program guide (EPG) information on the multimedia content, web information and social network service (SNS) information related to the multimedia content, or meta data stored in the electronic apparatus in connection with the multimedia content.

The electronic apparatus 100 may select at least one image frame related to the acquired information among the plurality of image frames (S430). The electronic apparatus 100 may generate description information for the at least one selected image frame based on the acquired information (S440). The electronic apparatus 100 may acquire description information for the acquired multimedia content based on the generated description information in connection with the at least one selected image frame (S450).

The description information may be information in a relational graph format representing a plurality of texts describing an object included in the image frame.

For example, in operation S430, the electronic apparatus 100 may select at least one image frame among the plurality of image frames through the following embodiment.

According to an embodiment, the electronic apparatus 100 may select at least one image frame including an object related to the acquired information in connection with the corresponding multimedia content among objects included in the plurality of image frames configuring the multimedia content.

For example, when a first object related to a first keyword among keywords included in acquired information is detected from a first image frame among the plurality of image frames configuring the multimedia content, the electronic apparatus 100 selects the first image frame.

The electronic apparatus 100 may track an object included in a second image frame subsequent to the first image frame including the first object related to the first keyword to determine whether the first object is present. If the first object is detected in the second image frame, the electronic apparatus 100 selects the second image frame.

If the first object is not detected from the second image frame, the electronic apparatus 100 may select the second image frame depending on whether the second object related to a second keyword among keywords included in the acquired information is present in the second image frame.

The electronic apparatus 100 may input the first image frame among the at least one selected image frame and the keyword included in the acquired information to the artificial intelligence model for object recognition to generate description information for the first image frame.

The electronic apparatus 100 may input the second image frame among the at least one selected image frame and the keyword included in the acquired information to the artificial intelligence model to generate description information for the second image frame.

As described above, when the description information for each of the first and second image frames is generated, the electronic apparatus 100 generates a relational graph for the multimedia content based on text included in each of the description information.

For example, if there is at least one associated text among a plurality of texts included in the description information for the first image frame and among the plurality of texts included in the description information for the second image frame, the electronic apparatus 100 may combine the at least one associated text to generate a relational graph for the multimedia content, and acquire the generated relational graph as description information for the multimedia content.

According to another embodiment, the electronic apparatus 100 may analyze each of a plurality of image frames configuring the multimedia content, and selects an image frame at a time when an image transition has occurred.

For example, the electronic apparatus 100 may analyze the image transition of the multimedia content using the image transition analysis algorithm, and may determine a plurality of representative frames for each of a plurality of sections.

The image transition analysis algorithm may, for example, include an algorithm for determining whether image transition has occurred by analyzing each of a plurality of image frames. The image transition analysis algorithm may be a known art, and thus, a detailed description thereof will not be provided here.

The electronic apparatus 100 may determine at least one representative frame including the object related to the keyword included in the acquired information in connection with the corresponding multimedia content, among the plurality of determined representative frames, as a key frame, and select an image frame included in a section including the image frame determined as the key frame.

The section may include the image frame determined as the key frame and an image frame preceding the image frame determined as the representative frame among successive image frames subsequent to the image frame determined as the key frame.

When a plurality of representative frames for each of the plurality of sections are determined, the electronic apparatus 100 determines at least one representative frame among the plurality of representative frames as a key frame based on the keyword included in the acquired information in connection with the acquired multimedia content.

The key frame may be an image frame including an object matched to the keyword included in the acquired information in connection with the multimedia content, among the plurality of representative frames.

As described above, the electronic apparatus 100 may select at least one representative frame including an object associated with a keyword included in the acquired information in connection with the multimedia content, among the plurality of representative frames, using the object recognition algorithm and may determine the at least one representative frame as a key frame.

When the key frame corresponding to at least one section of a plurality of sections configuring the multimedia content is determined, the electronic apparatus 100 may generate description information for at least one section including the image frame corresponding to the key frame.

For example, the electronic apparatus 100 may input each of the image frames included in a first section among at least one section including the image frame corresponding to the key frame and the keyword included in the acquired information to an artificial intelligence model for object recognition to generate description information for each of the image frames included in the first section. The electronic apparatus 100 may combine the description information for each of the image frames included in the first section to acquire description information of the first section.

Similarly, the electronic apparatus 100 may input each of the image frames included in a second section among at least one section including the image frame corresponding to the key frame and the keyword included in the acquired information to an artificial intelligence model for object recognition to acquire description information for each of the image frames included in the second section. The electronic apparatus 100 may combine the description information for each of the image frames included in the second section to acquire description information of the second section.

As described above, the description information may be information in a relational graph format indicating a plurality of texts describing an object included in the image frame.

When there is at least one associated text in a plurality of texts included in the description information of the first section and in a plurality of texts included in the description information of the second section, the electronic apparatus 100 may combine the at least one associated text to generate a relational graph on the multimedia content. Therefore, the electronic apparatus 100 may acquire the relational graph on the multimedia content generated based on the description information of the first and second sections as description information of the corresponding multimedia content.

In a state in which the description information for the multimedia content is generated through the sequentially performed operations described above, when a user command regarding the corresponding multimedia content is received, the electronic apparatus 100 may generate scene content associated with the user command based on the description information for the corresponding multimedia content and output the generated scene content (S460 and S470).

Figure 5:
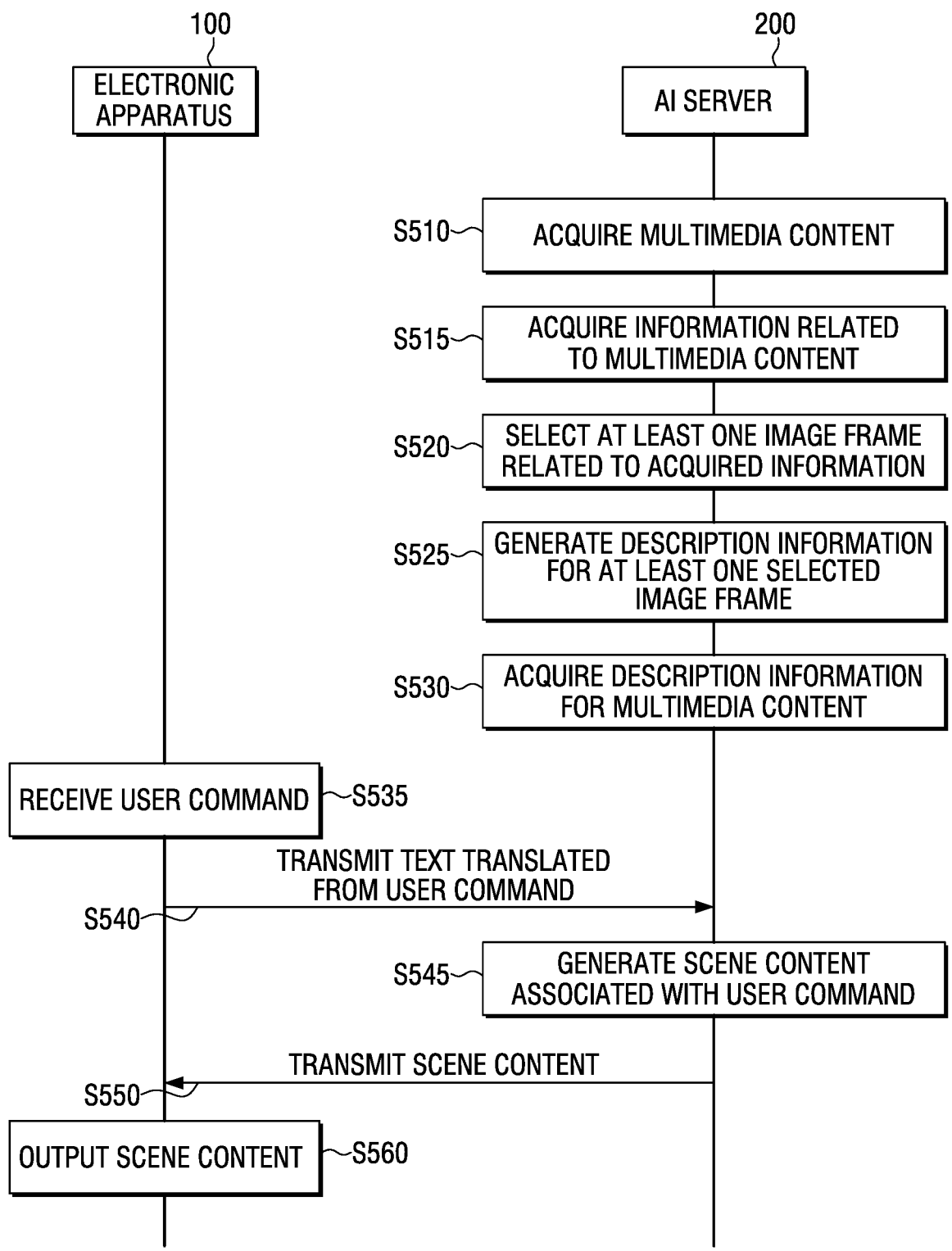
FIG. 5 is a sequence diagram illustrating an example method of providing scene content associated with a user command in cooperation with an artificial intelligence server in an electronic apparatus according to another embodiment of the disclosure.

FIG. 5 is a sequence diagram illustrating an example method of providing scene content associated with a user command in cooperation with an artificial intelligence server in an electronic apparatus according to another embodiment of the disclosure.

As illustrated in FIG. 5, the artificial intelligence server 200 acquires multimedia content including a plurality of image frames and information related to multimedia content (S510 and S515).

The artificial intelligence server 200 may select at least one image frame among the plurality of image frames using a keyword included in the acquired information (S520).

However, the disclosure is not limited thereto, and when request information for generating description information is received from the electronic apparatus 100, the artificial intelligence server 200 receives multimedia content corresponding to the received request information and information related to the corresponding multimedia content from at least one of an external server (not shown) or the electronic apparatus 100. The artificial intelligence server 200 may select at least one image frame among a plurality of image frames included in the multimedia content based on a keyword included in the information on the multimedia content.

The artificial intelligence server 200 may generate description information for the at least one selected image frame and acquires description information for the multimedia content using the generated description information for the at least one image frame (S525 and S530). The information on the multimedia content may include at least one of EPG information on the multimedia content, web information and SNS information related to the corresponding multimedia content, and metadata stored in the electronic apparatus 100 in connection with the multimedia content.

The method of acquiring description information for the multimedia content through the operations S520 to S530 described above in the artificial intelligence server 200 is the same as, or similar to, the method performed in the electronic apparatus 100 of FIG. 4, and thus, a detailed description thereof will not be repeated here.

When a user command regarding the multimedia content is input through the microphone 111 provided in the electronic apparatus 100, the electronic apparatus 100 translates the corresponding user command into text and transmits the translated text to the artificial intelligence server 200 (S535 and S540).

When the text translated from the user command regarding the multimedia content is received from the electronic apparatus 100, the artificial intelligence server 200 compares the received text with text included in the description information for the multimedia content requested by the user to generate scene content associated with the user command, and transmits the generated scene content to the electronic apparatus 100 (S545 and S550).

Accordingly, the electronic apparatus 100 outputs the scene content associated with the user command received from the artificial intelligence server 200 in the form of at least one of video or audio data (S560).

Figure 6:
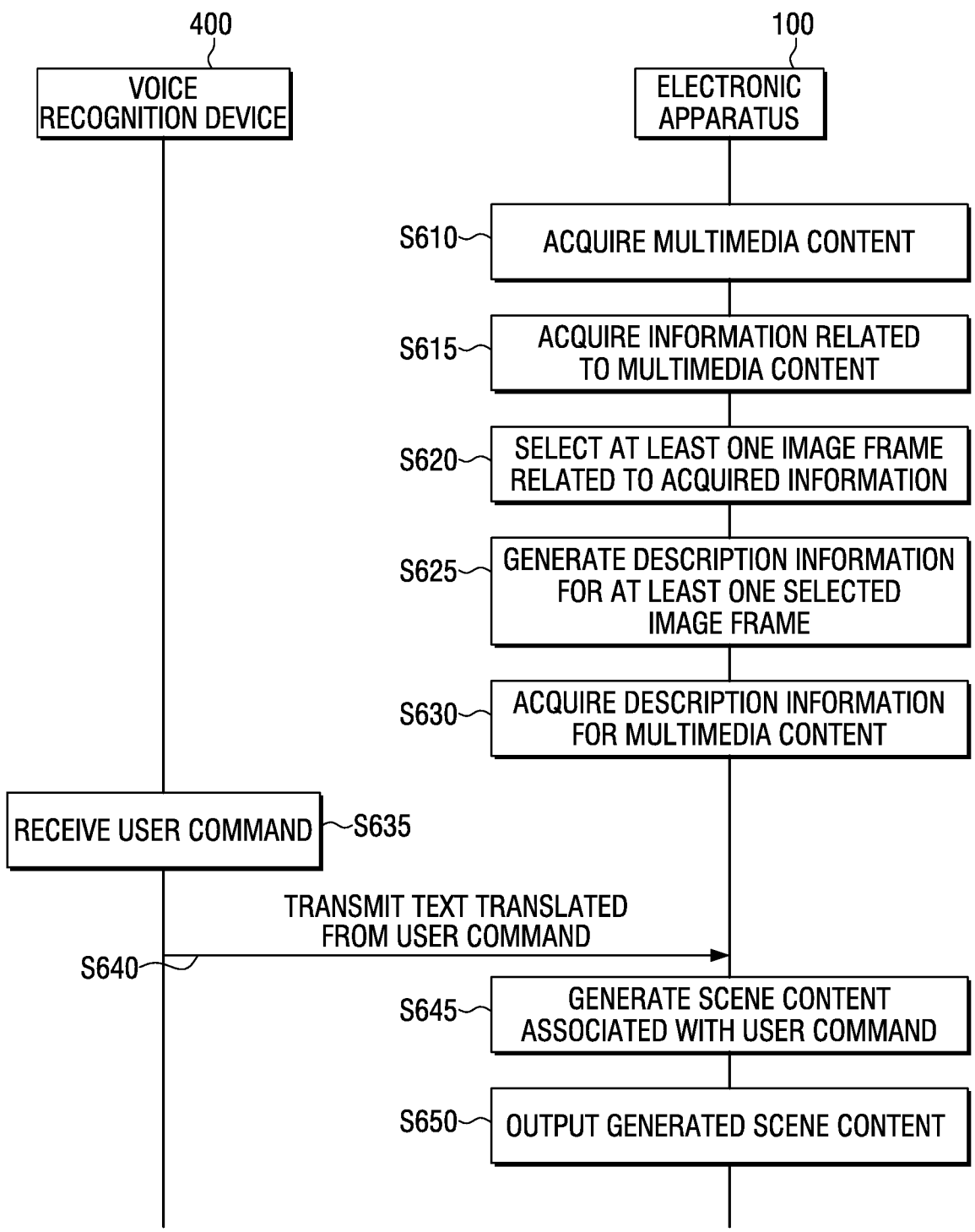
FIG. 6 is a sequence diagram illustrating an example method of providing scene content associated with a user command in cooperation with a voice recognition device for controlling an electronic apparatus in an electronic apparatus according to another embodiment of the disclosure.

FIG. 6 is a sequence diagram illustrating an example method of providing scene content associated with a user command in cooperation with a voice recognition device for controlling an electronic apparatus in an electronic apparatus according to another embodiment of the disclosure.

As illustrated in FIG. 6, a voice recognition device 400 may be a control device receiving a user voice command, transmitting a control command corresponding to the input user voice command, and controlling the operation of the electronic apparatus 100. The voice recognition device 400 may, for example, and without limitation, be a remote control device, an AI speaker, or the like.

The electronic apparatus 100 interworking with the voice recognition device 400 may acquire multimedia content including a plurality of image frames and information related to the multimedia content (S610 and S615).

The electronic apparatus 100 may select at least one image frame among the plurality of image frames using a keyword included in the acquired information (S620).

However, the disclosure is not limited thereto, and when request information for generating description information is received from the voice recognition device 400, the electronic apparatus 100 may receive multimedia content corresponding to the received request information and information related to the corresponding multimedia content from an external server (not shown) or from a plurality of pieces of data stored in the electronic apparatus 100 in advance. The electronic apparatus 100 may select at least one image frame among a plurality of image frames included in the multimedia content based on the keyword included in the information on the acquired multimedia content.

The electronic apparatus 100 may generate description information for the selected at least one image frame, and acquire description information for the multimedia content using the description information for the generated at least one image frame (S625 and S630)

The multimedia content-related information may include at least one of electronic program guide (EPG) information on multimedia content, web information and social network service (SNS) information related to multimedia content, and meta data stored in the electronic apparatus 100 in connection with the multimedia content.

A method of acquiring description information for the multimedia content through the above-described operations S620 to S630 in the electronic apparatus 100 has been described in detail with reference to FIG. 4, and thus, a detailed description thereof will not be repeated here.

When a user command for the multimedia content is input, the voice recognition device 400 translates the input user command into text and transmits the translated text to the electronic apparatus 100 (S635 and 640). The user command may be a voice command uttered by the user.

When the text translated from the user command regarding the multimedia content is received from the voice recognition device 400, the electronic apparatus 100 compares the received text with text included in the description information for the multimedia content requested by the user to generate scene content associated with the user command, and output the generated scene content (S645 and S650).

Hereinafter, an operation of generating description information for a selected image frame among a plurality of image frames included in multimedia content in the electronic apparatus 100 according to the disclosure will be described in detail.

Figure 7:
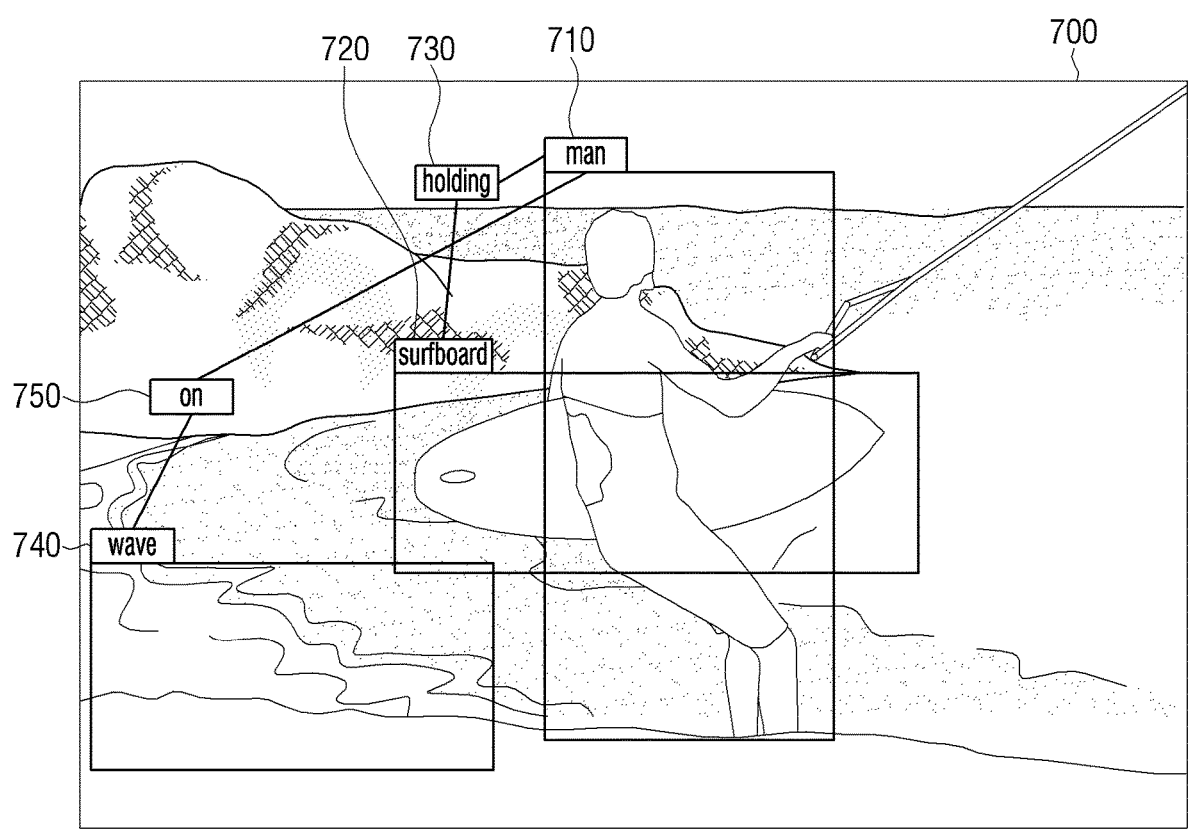
FIG. 7 is a diagram illustrating an example of detecting an object included in a first image frame among a plurality of image frames included in multimedia content based on information related to multimedia content in an electronic apparatus according to an embodiment of the disclosure.
Figure 8:
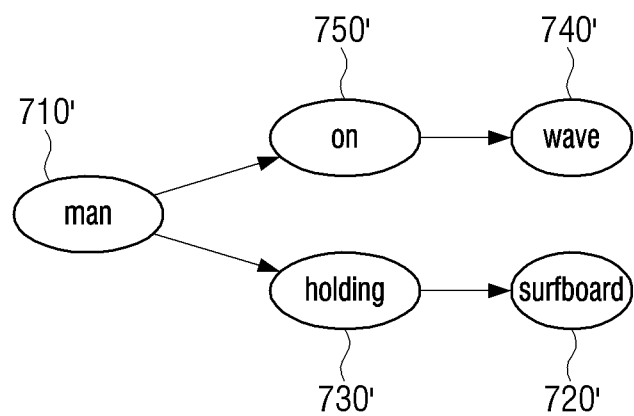
FIG. 8 is a diagram illustrating an example of providing description information for a first image frame based on information related to multimedia content in an electronic apparatus according to an embodiment of the disclosure.

FIG. 7 is a diagram illustrating an example of detecting an object included in a first image frame among a plurality of image frames included in multimedia content based on information related to multimedia content in an electronic apparatus according to an embodiment of the disclosure, and FIG. 8 is a diagram illustrating an example of generating description information for a first image frame based on information related to multimedia content in an electronic apparatus according to an embodiment of the disclosure.

As illustrated in FIG. 7, the electronic apparatus 100 may detect a plurality of objects included in a first image frame 700 among a plurality of image frames included in multimedia content using a keyword included in information related to the multimedia content.

For example, the multimedia content may include a scene for a person who enjoys various extreme sports on a beach and text information depicting each scene.

In this example, the electronic apparatus 100 may extract a plurality of keywords from the text information related to the multimedia content, and detect a plurality of objects included in the first image frame 700 among the plurality of image frames.

As illustrated, the electronic apparatus 100 may detect a first object related to "man" which may be a first keyword 710, a second object related to "surfboard" which may be a second keyword 720, and a third object related to "wave" which may be a third keyword 740, among the objects included in the first image frame 700 based on the keywords extracted from the text information related to the corresponding multimedia content.

Also, the electronic apparatus 100 may acquire "holding" which may be a fourth keyword 730 indicative of an association between the first and second detected objects and "on" which may be a fifth keyword 750 indicative of an association between the first and third objects among the keywords extracted from the text information related to the corresponding multimedia content.

As described above, when the first to third objects for the first to third keywords 710, 720 and 740 and the fourth and fifth keywords 730 and 750 indicative of the association between the first to third objects are acquired, the electronic apparatus 100 generates a relational graph using the first to fifth keywords 710, 720, 730, 740 and 750.

For example, the electronic apparatus 100 may generate a relational graph (hereinafter, referred to as a first relational graph) depicting the first and third objects using the first, third, and fifth keywords 710, 740, and 750 and generate a relational graph (hereinafter, referred to as a second relational graph) depicting the first and second objects using the first, second, and fourth keywords 710, 720, and 730.

For example, as illustrated in FIG. 8, the electronic apparatus 100 arranges "man" which is the first keyword 710 at a first node 710' of the first relational graph depicting first and third objects and arranges "wave" which is the third keyword 740 at a third node 740'.

The electronic apparatus 100 arranges "on" which is the fifth keyword 750 connecting "man" and "wave" respectively arranged at the first and third nodes 710' and 740', in a second node 750' positioned between the first and third nodes 710' and 740' of the first relational graph.

Accordingly, the electronic apparatus 100 may generate the first relational graph depicting the first and third objects.

Further, the electronic apparatus 100 arranges "man" which is the first keyword 710 at the first node 710' of the second relational graph depicting the first and second objects and arranges "surfboard" which is the second keyword 720 at the third node 720'.

Further, the electronic apparatus 100 arranges "holding" which is a fourth keyword 730 connecting "man" and "surfboard" respectively arranged at the first and third nodes 710' and 720', at a second node 730' positioned between the first and third nodes 710' and 720' of the second relational graph.

Thus, the electronic apparatus 100 may generate the second relational graph depicting the first and second objects.

As such, when the first relational graph depicting the first and third objects and the second relational graph depicting the first and second objects are generated, the electronic apparatus 100 may generate a relational graph for the first image frame 700 by connecting the nodes including associated keywords using the keywords included in the nodes respectively configuring the first and second relational graphs.

As shown, the first node 710' configuring the first and second relational graphs may include the same keyword.

In this case, the electronic apparatus 100 may process, as a common node, the first node 710' among the nodes respectively configuring the first and second relational graphs and generate a relational graph depicting the first to third objects included in the first image frame 700 by connecting the other nodes configuring the first and second relational graphs to the first node 710' processed as the common node.

However, the disclosure is not limited thereto, and the electronic apparatus 100 may process the first nodes 710' of the nodes respectively configuring the first and second relational graphs to be associated with each other to generate a relational graph depicting the first to third objects included in the first image frame 700.

When the relational graph regarding at least one image frame among the plurality of image frames included in the multimedia content is generated through the embodiment described above, the electronic apparatus 100 may generate an overall relational graph for the corresponding multimedia content based on the text included in the relational graph generated for each of at least one image frame.

Thus, the electronic apparatus 100 may acquire the overall relational graph generated in connection with the multimedia content, as description information for the multimedia content.

Hereinafter, an operation of generating description information for multimedia content acquired by the electronic apparatus 100 according to the disclosure and providing scene content associated with a user command based on the generated description information for the multimedia content will be described in greater detail.

Figure 9A:
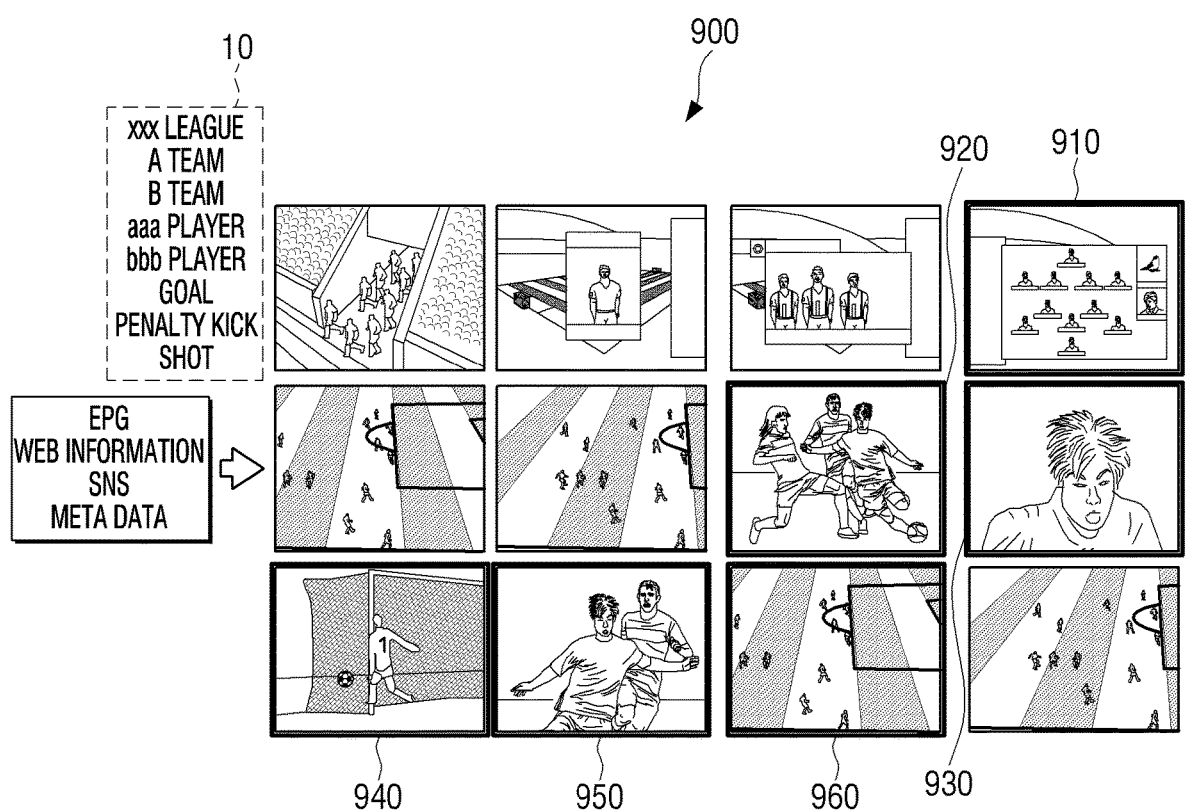
FIGS. 9A and 9B are diagrams illustrating an example of providing description information for multimedia content in an electronic apparatus according to an embodiment of the disclosure.
Figure 9B:
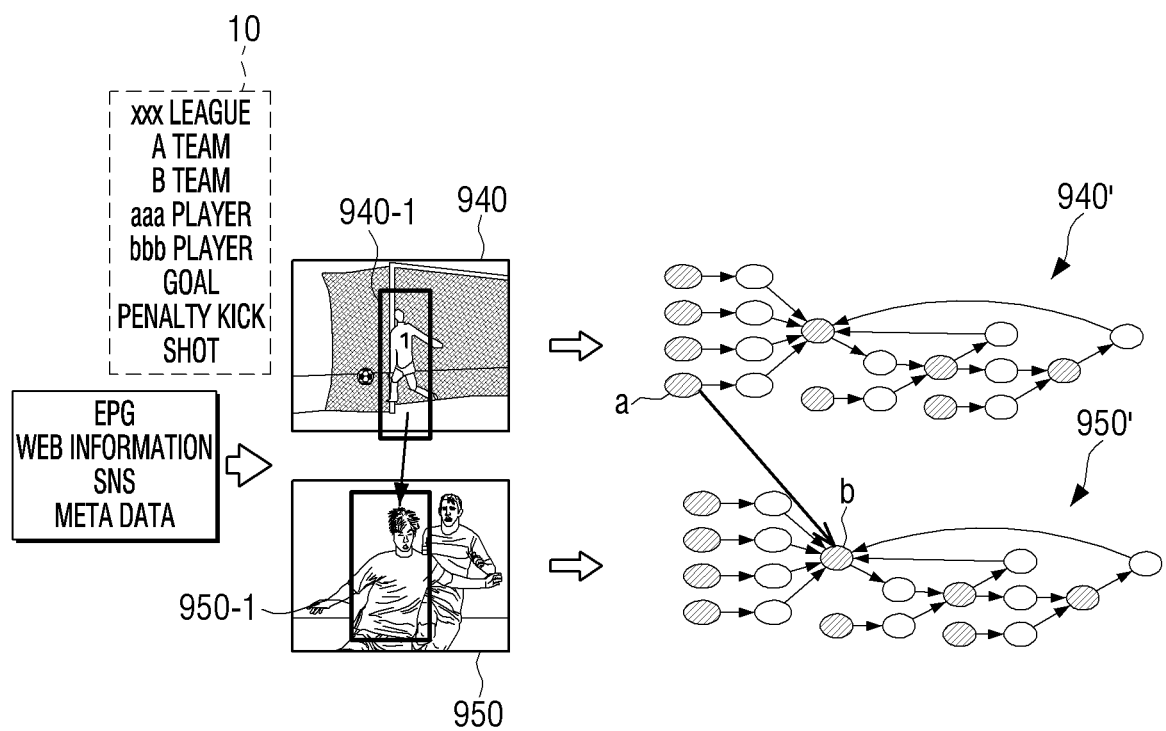

FIGS. 9A and 9B are diagrams illustrating an example of generating description information for multimedia content in an electronic apparatus according to an embodiment of the disclosure.

As illustrated in FIG. 9A, the electronic apparatus 100 acquires multimedia content 900 including a plurality of image frames and a plurality of keywords 10 included in information related to the multimedia content 900.

Thereafter, the electronic apparatus 100 selects at least one image frame including an object related to the acquired keyword 10 among the plurality of image frames included in the multimedia content 900.

As illustrated, the electronic apparatus 100 may select image frames (hereinafter, referred to as first to sixth image frames) 910, 920, 930, 940, 950 and 960 including an object related to the acquired keyword 10 among the plurality of image frames included in the multimedia content 900.

For example, the second image frame 920 may include a first object related to "aaa player" among the acquired keywords 10. In this example, the electronic apparatus 100 selects the second image frame 920. Thereafter, the electronic apparatus 100 tracks objects included in the successive image frames after the second image frame 920 to determine whether the first object included in the second image frame 920 is present in the corresponding image frames. When the first object is detected from the successive third to fifth image frames 930, 940 and 950 after the second image frame 920 as a result of the determination, the electronic apparatus 100 selects the third to fifth image frames 930, 940 and 950.

The sixth image frame 960 subsequent to the fifth image frame 950 may not include the first object but include a second object related to "penalty kick" among the acquired keywords 10.

In this example, the electronic apparatus 100 selects the sixth image frame 960 including the second object associated with "penalty kick". Thereafter, the electronic apparatus 100 tracks the objects included in the successive image frames after the sixth image frame 960 to determine whether the second object is present. If the second object is not detected from the image frames after the sixth image frame 960 as a result of the determination, the electronic apparatus 100 determines whether the successive image frames after the sixth image frame 960 include an object related to the other keywords excluding "penalty kick" among the acquired keywords 10.

If it is determined that the successive image frames after the sixth image frame 960 does not include the objects related to other keywords excluding "penalty kick" among the acquired keywords 10, the electronic apparatus 100 does not select the successive image frames after the sixth image frame 960.

Through this example, the electronic apparatus 100 may select the first to sixth image frames 910, 920, 930, 940, 950 and 960 related to the keywords included in the acquired information among the plurality of image frames included in the multimedia content 900.

When the first to sixth image frames 910, 920, 930, 940, 950 and 960 including the object related to the keyword 10 are selected, the electronic apparatus 100 generates description information for each of the first to sixth selected image frames 910, 920, 930, 940, 950 and 960 among the plurality of image frames.

The operation of generating the description information for each of the selected first to sixth image frames 910, 920, 930, 940, 950 and 960 has been described in detail with reference to FIGS. 7 and 8, and thus, a detailed description thereof will not be repeated here.

When the description information for each of the first to sixth image frames 910, 920, 930, 940, 950 and 960 is generated, the electronic apparatus 100 compares text included in the description information for each of the first to sixth image frames 910, 920, 930, 940, 950 and 960 and combines associated text.

The description information for each of the first to sixth image frames 910, 920, 930, 940, 950 and 960 is information in a relational graph format indicative of a plurality of texts describing the objects included in the first to sixth image frames 910, 920, 930, 940, 950 and 960.

Accordingly, the electronic apparatus 100 compares the plurality of texts configuring the relational graph for each of the first to sixth image frames 910, 920, 930, 940, 950 and 960 and combine related texts to generate an overall relational graph.

For example, as illustrated in FIG. 9B, each of the fourth and fifth image frames 940 and 950 among the first to sixth selected image frames 910, 920, 930, 940, 950 and 960 may include first objects 940-1 and 950-1 related to the keyword "aaa player".

In this example, the electronic apparatus 100 combines texts regarding the associated "aaa player" among the plurality of texts configuring a relational graph 940' for the fourth image frame 940 and among the plurality of texts configuring a relational graph 950' for the fifth image frame 950.

For example, electronic apparatus 100 connects a node a where the text regarding "aaa player" among the plurality of texts configuring the relational graph 940' for the fourth image frame 940 is positioned and a node b where the text regarding "aaa player" among the plurality of texts configuring the relational graph 950' for the fifth image frame 950 is positioned.

Through this example, the electronic apparatus 100 connects nodes where associated texts are positioned among the plurality of texts configuring the relational graph for each of the first to sixth image frames 910 to 960.

Accordingly, the electronic apparatus 100 may generate the overall relational graph for the multimedia content 900 and acquire the overall relational graph for the multimedia content 900 as description information for the corresponding multimedia content 900.

Figure 10A:
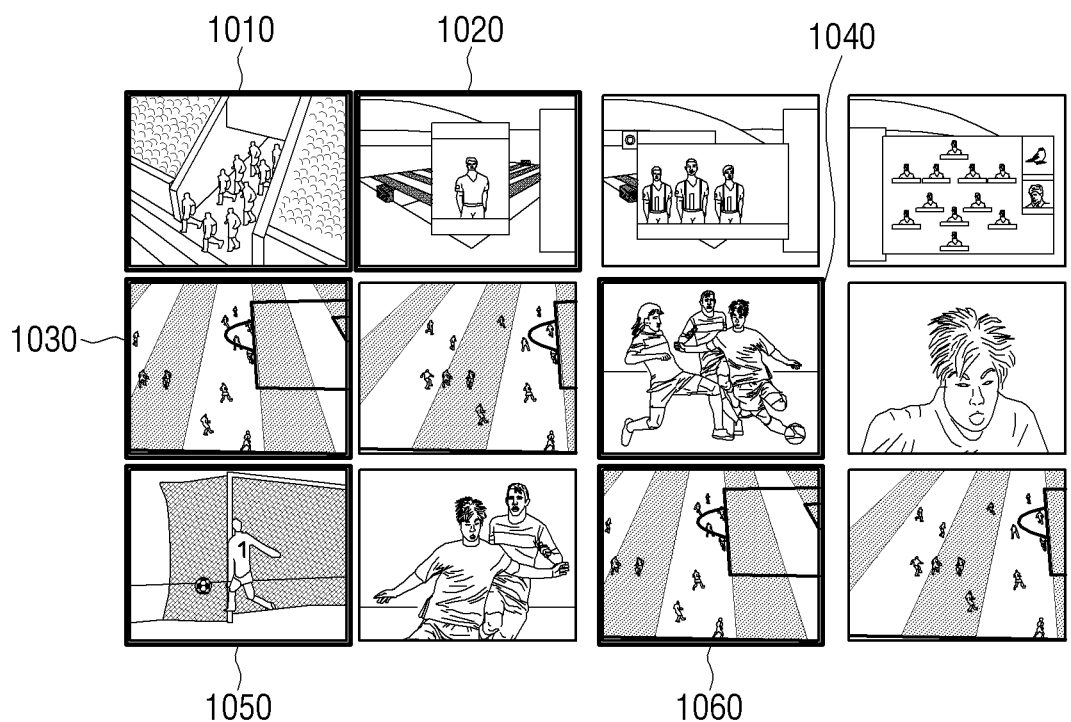
FIGS. 10A and 10B are diagrams illustrating an example of providing description information for multimedia content in an electronic apparatus according to another embodiment of the disclosure.
Figure 10B:
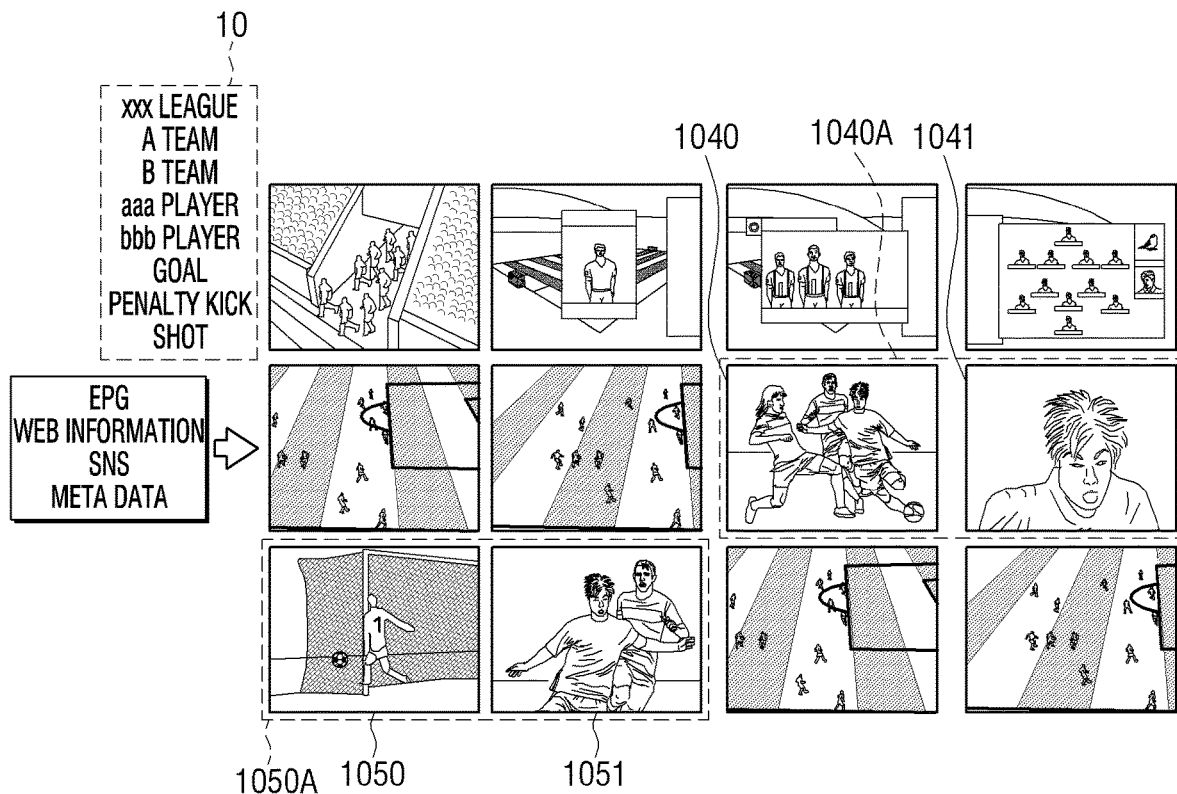

FIG. 10A and FIG. 10B are diagrams illustrating an example of generating description information for multimedia content in an electronic apparatus according to another embodiment of the disclosure.

As described in FIG. 9, the electronic apparatus 100 acquires the multimedia content 900 including a plurality of image frames and the plurality of keywords 10 included in the information related to the multimedia content 900.

When the multimedia content 900 and the plurality of keywords 10 related to the multimedia content 900 are acquired, the electronic apparatus 100 analyzes the plurality of image frames included in the acquired multimedia content 900 and determines an image frame in which an image transition has occurred, as a representative frame.

For example, as illustrated in FIG. 10A, the electronic apparatus 100 may determine a first image frame 1010, which is a start frame among a plurality of image frames included in the multimedia content 900, as a first representative frame. Thereafter, the electronic apparatus 100 performs a scene analysis on successive image frames after the first image frame 1010 to determine whether there is an image frame in which image transition has occurred.

As illustrated, if it is determined that the second image frame 1020 among the successive image frames after the first image frame 1010 is an image frame in which the image transition has occurred, the electronic apparatus 100 may determine the second image frame 1020 in which image transition is determined to have occurred, as a second representative frame.

Through this embodiment, the electronic apparatus 100 may determine the first to sixth image frames 1010, 1020, 1030, 1040, 1050 and 1060, in which image transition is determined to have occurred, among the plurality of image frames configuring the multimedia content 900, as a representative frame of each section.

For example, as illustrated in FIG. 10B, the electronic apparatus 100 may determine a fourth image frame 1040 determined as a representative frame and a frame 1041 before a fifth frame 1050 determined as a representative frame among successive image frames after the fourth image frame 1040, as the same section.

If a section for each of the first to sixth image frames 1010, 1020, 1030, 1040, 1050 and 1060 determined as representative frames among the image frames included in the multimedia content 900 is determined, the electronic apparatus 100 determines at least one of the first to sixth image frames 1010, 1020, 1030, 1040, 1050 and 1060 determined as representative frames as a key frame using the acquired keywords 10.

As shown, the keywords 10 included in the information related to the multimedia content 900 may include "xxx league, A team, B team, aaa player, bbb player, goal, penalty kick, shot".

Thus, when the first to sixth image frames 1010, 1020, 1030, 1040, 1050 and 1060 among the plurality of image frames configuring the multimedia content 900 are determined as the representative frames as illustrated in FIG. 10A, the electronic apparatus 100 determines, as a key frame, an image frame associated with the acquired keyword 10 in connection with the multimedia content 900 among the first to sixth image frames 1010, 1020, 1030, 1040, 1050 and 1060 determined as representative frames. The electronic apparatus 100 generates description information for a section including the image frame determined as the key frame.

For example, the fourth and fifth image frames 1040 and 1050 among the first to sixth image frames 1010, 1020, 1030, 1040, 1050 and 1060 determined as representative frames may be determined as key frames. In this case, the electronic apparatus 100 generates description information for a first section 1040A including the fourth image frame 1040 determined as the key frame and the image frame 1041 subsequent to the fourth image frame. Further, the electronic apparatus 100 generates description information for a second section 1050A including the fifth image frame 1050 determined as the key frame and an image frame 1051 subsequent to the fifth image frame.

For example, the electronic apparatus 100 generates description information for each of the fourth image frame 1040 and the successive image frames 1041 included in the first section 1040 using the acquired keyword 10. Further, the electronic apparatus 100 generates description information for each of the fifth image frame 1050 and the successive image frame 1051 included in the second section 1050A using the acquired keyword 10.

The operation of generating the description information for an image frames has been described in detail with reference to FIGS. 7 and 8, and thus, a detailed description thereof will not be repeated here.

When the description information for the image frame included in each of the first and second sections 1040A and 1050A is generated, the electronic apparatus 100 may generate description information for each of the first and second sections 1040A and 1050A ed based on the text included in the description information for the frame.

For example, the electronic apparatus 100 compares the text included in the description information of each of the fourth image frame 1040 and the successive image frame 1041 included in the first section 1040A and combines associated texts.

The description information for each of the fourth image frame 1040 and the successive image frames 1041 is information in a relation graph format indicative of a plurality of texts describing objects included in the fourth image frame 1040 and the successive image frames 1041.

Thus, the electronic apparatus 100 may compare a plurality of texts configuring the relational graph for each of the fourth image frame 1040 and the successive image frame 1041 and combine related texts to generate a relational graph for the first section 1040A.

When the relational graph for the first and second sections 1040A and 1050A is generated through the embodiment described above, the electronic apparatus 100 may acquire description information for the multimedia content 900 using the relational graph for the first and second sections 1040A and 1050A.

Accordingly, the electronic apparatus 100 may generate an overall relational graph for the multimedia content 900, and the overall relational graph for the multimedia content 900 and acquire the overall relational graph for the multimedia content 900 as description information for the corresponding multimedia content 900.

For example, the electronic apparatus 100 may compare the text included in the description information of each of the first and second sections 1040A and 1050A and combine associated texts to generate description information for the multimedia content 900.

For example, the electronic apparatus 100 may compare the plurality of texts included in the description information for each of the first and second sections 1040A and 1050A and combine the related texts to generate the overall relational graph for the multimedia content 900 and acquire the generated overall relational graph for the multimedia content 900 as description information for the multimedia content 900.

Figure 11A:
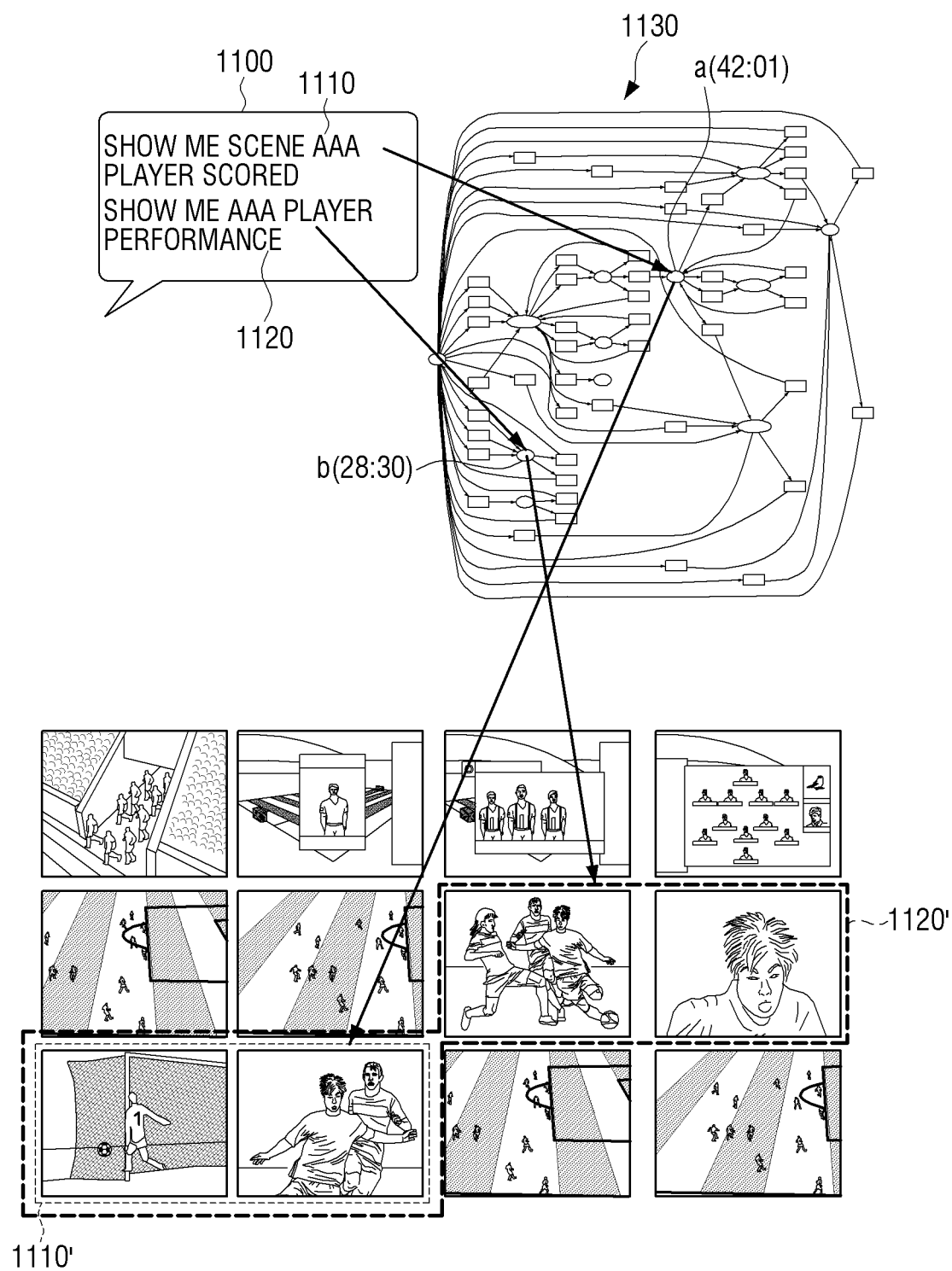
FIGS. 11A and 11B are diagrams illustrating an example of providing scene content associated with a user command based on description information for multimedia content in an electronic apparatus according to an embodiment of the disclosure.
Figure 11B:
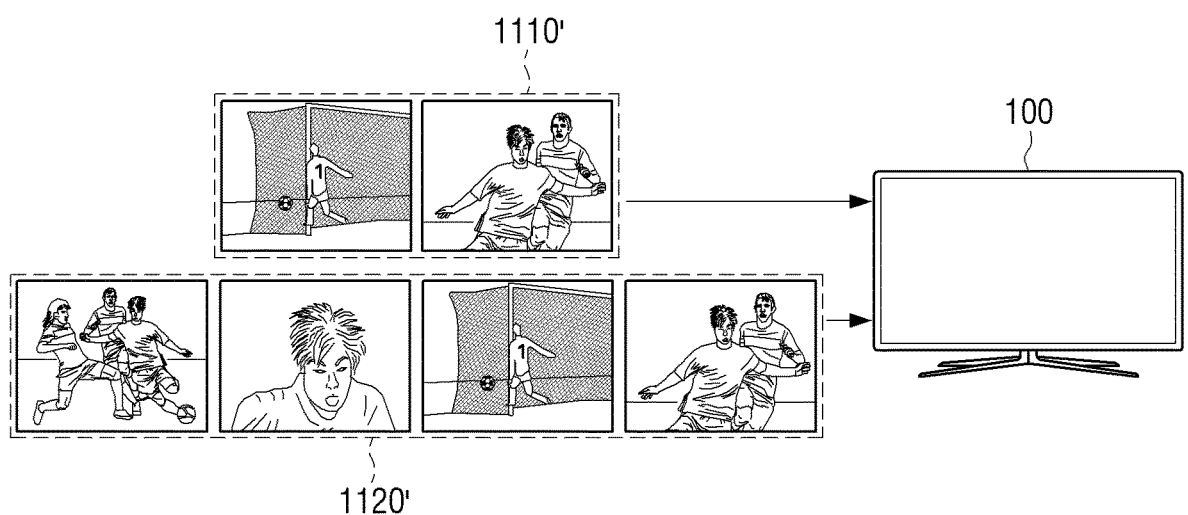

FIG. 11A and FIG. 11B are diagrams illustrating an example of providing scene content associated with a user command based on description information for multimedia content in an electronic apparatus according to an embodiment of the disclosure.

The electronic apparatus 100 may receive a user command 1100 through the inputter 110. Here, the user command 1100 may be a voice command uttered by the user.

The user command 1100 may be received through the voice recognition device 400 controlling the electronic apparatus 100 as described above, as well as through the inputter 110.

When the user command 1100 is input, the electronic apparatus 100 compares text included in the input user command 1100 with text included in the description information generated in connection with the multimedia content requested by the user and generates and outputs scene content related to the user command 1100.

For example, as illustrated in FIG. 11A, the electronic apparatus 100 may receive a user's first uttered voice command 1110 of "Show me scene aaa player scored".

When the user's first uttered voice command 1110 is input, the electronic apparatus 100 acquires translated text from the input user's first uttered voice command 1110.

The electronic apparatus 100 compares the text translated from the user's first uttered voice command 1110 with the text included in the relational graph indicative of the description information generated in connection with the multimedia content requested by the user. For example, the electronic apparatus 100 compares the text translated from the user's first uttered voice command 1110 with the text included in the plurality of nodes configuring a relational graph 1130.

The electronic apparatus 100 determines a node that includes text associated with the text acquired from the user's first uttered voice command 1110 among the plurality of nodes configuring the relational graph 1130.

For example, a node a among the plurality of nodes configuring the relational graph 1130 may include text associated with a 'goal' text among texts acquired from the user's first uttered voice command 1110.

For example, among the plurality of nodes configuring the relational graph 1130, the node a may be a node associated with the text regarding the "aaa player, goal" acquired from the user's first uttered voice command 1110.

In this example, the electronic apparatus 100 selects an image frame corresponding to the node a among a plurality of image frames configuring multimedia content and a first section 1110' including the image frame corresponding to the node a.

According to an embodiment, each node configuring the relational graph 1130 for multimedia content may include time information regarding a plurality of image frames configuring the corresponding multimedia content.

Thus, the electronic apparatus 100 selects an output image frame according to time information (42:01) included in the node a among the plurality of image frames configuring the multimedia content based on the time information (42:01) regarding the node a including text associated with 'goal' text among texts translated from the user's first uttered voice command 1110.

The electronic apparatus 100 selects a first section 1110' including the selected image frame and generates the selected first section 1110' as scene content associated with the user's first uttered voice command 1110.

The electronic apparatus 100 may output the scene content for the first section 1110' selected in connection with the user's first uttered voice command 1110 on the screen as illustrated in FIG. 11B.

The electronic apparatus 100 may receive a user's second uttered voice command 1120 "Show me aaa player performance".

When the second uttered voice command 1120 of the user is input, the electronic apparatus 100 acquires the text translated from the input user's second uttered voice command 1120.

The electronic apparatus 100 compares the text acquired from the user's second uttered voice command 1120 with the text included on the plurality of nodes configuring the relational graph 1130 to determine nodes including the text associated with the text translated from the user's second uttered voice command 1120.

For example, a node b of a plurality of nodes configuring the relational graph 1130 may include text associated with the "performance" text among the text translated from the user's second uttered voice command 1130.

For example, the node b among the plurality of nodes configuring the relational graph 1130 may be a node associated with the text regarding "aaa player, performance" acquired from the user's second uttered voice command 1120.

In this example, the electronic apparatus 100 may select a second section 1120' including an image frame output according to time information (28:30) included in the node b among the plurality of image frames configuring the multimedia content based on the time information (28:30) included in the node b including text associated with the "performance" text among texts translated from the user's second uttered voice command 1120.

The electronic apparatus 100 generates an image frame included in the selected second section 1120' as scene content associated with the user's second uttered voice command 1120. As illustrated in FIG. 11B, the electronic apparatus 100 may output, on the screen, scene content for the second section 1120' selected in connection with the user's second uttered voice command 1120 as illustrated in FIG. 11B.

Figure 12:
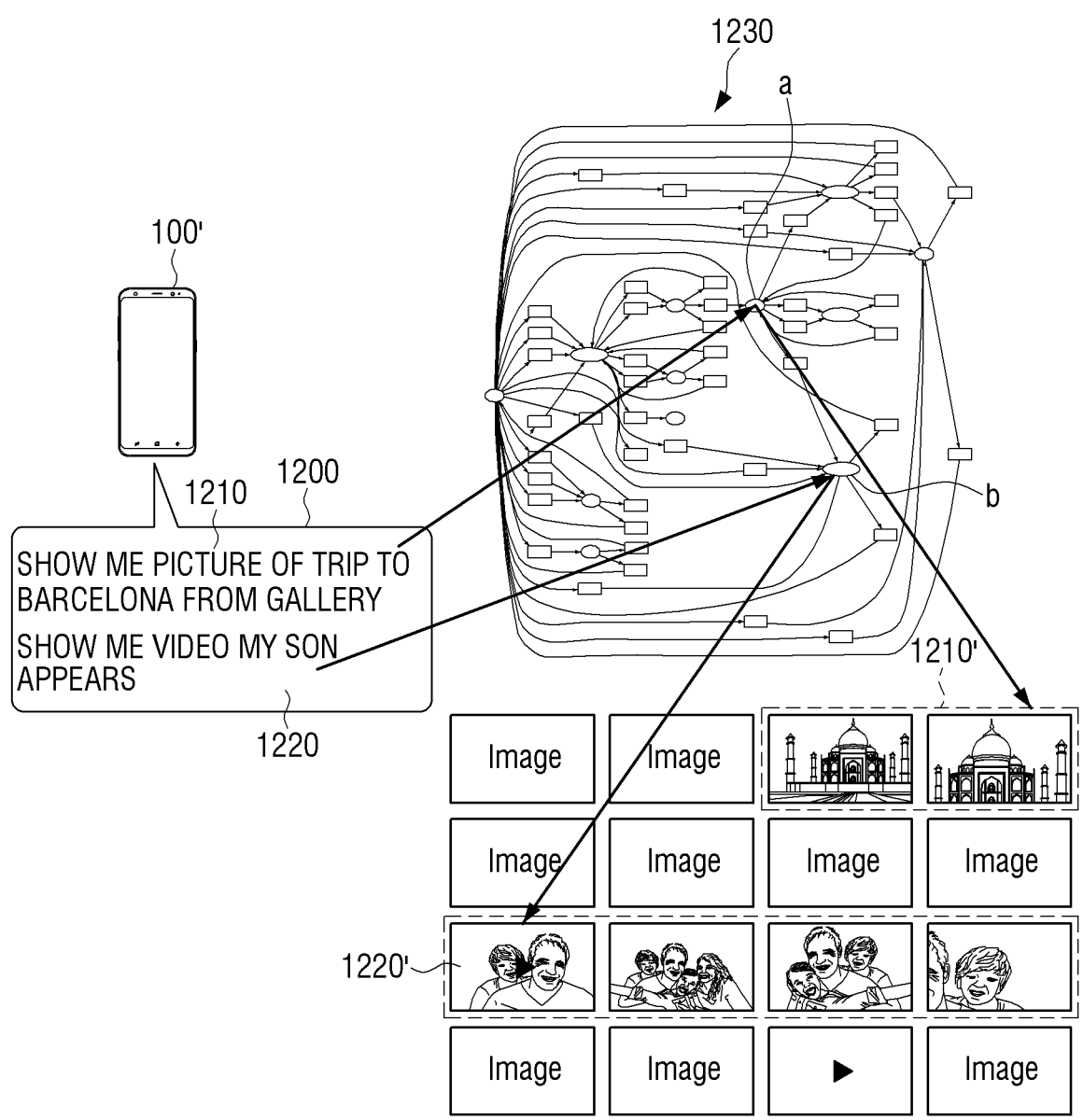
FIG. 12 is a diagram illustrating another example of providing scene content associated with a user command based on description information for multimedia content in an electronic apparatus according to another embodiment of the disclosure.

FIG. 12 is a diagram illustrating another example of providing scene content associated with a user command based on description information for multimedia content in an electronic apparatus according to another embodiment of the disclosure.

As illustrated in FIG. 12, the electronic apparatus 100' may, for example, be a display device such as a smartphone. Such an electronic apparatus 100' may store gallery content including still images and videos. In addition, the electronic apparatus 100' may store description information acquired in connection with the gallery content through the embodiment described above.

For example, the electronic apparatus 100' executes a gallery application for displaying the gallery content according to a user command. In a state in which the execution screen of the gallery application for displaying the gallery content is displayed, the electronic apparatus 100' may receive a user's uttered voice command 1200.

For example, the electronic apparatus 100' may receive a user's first uttered voice command 1210 of "Show me picture of trip to Barcelona from gallery".

When the user's first uttered voice command 1210 is input, the electronic apparatus 100' acquires text translated from the input first uttered voice command 1210.

The electronic apparatus 100' compares text translated from the user's first uttered voice command 1210 with text included in a relational graph 1230 representing description information on the gallery content requested by the user. For example, the electronic apparatus 100' compares the text translated from the user's first uttered voice command 1210 with the text included on a plurality of nodes configuring the relational graph 1230.

The electronic apparatus 100' determines a node that includes text associated with the text acquired from the user's first uttered voice command 1210 among a plurality of nodes configuring the relational graph 1230.

For example, the node a among the plurality of nodes configuring the relational graph 1230 may include text associated with the 'Barcelona' text among the texts acquired from the user's first uttered voice command 1210.

In this example, the electronic apparatus 100' selects a still image and videos 1210' corresponding to the node a, among the still images and videos included in the gallery content.

According to an embodiment, each node configuring the relational graph 1230 for the gallery content may include time information at a time point when the still images and videos included in the corresponding gallery content were generated.

Thus, the electronic apparatus 100' may select a still image and a video corresponding to the node a, among the still images and videos included in the gallery content based on the time information regarding the node a including text associated with the "Barcelona" text, among texts translated from the first uttered voice command 1210.

Thereafter, the electronic apparatus 100' may output only the still image and video corresponding to the node a, among the still images and the videos included in the gallery content, on the screen.

However, the disclosure is not limited thereto, and the electronic apparatus 100' may move the execution screen of the gallery content to a location where the still image and the video corresponding to the node a are located and display the execution screen.

The electronic apparatus 100' may receive a user's second uttered voice command 1220 of "Show me video my son appears".

If such a user's second uttered voice command 1220 is input, the electronic apparatus 100' acquires text translated from the input second uttered voice command 1220.

The electronic apparatus 100' compares the text acquired from the user's second uttered voice command 1220 with the text included on a plurality of nodes configuring the relational graph 1230 and determine a node including text associated with the text translated from the second uttered voice command 1220.

For example, a node b among the plurality of nodes configuring the relational graph 1230 may include text associated with "son" and "video" among the text translated from the user's second uttered voice command 1220.

In this example, the electronic apparatus 100' selects a video 1220' corresponding to the node b among the still images and videos included in the gallery content.

In other words, the electronic apparatus 100' may be configured to select only the video 1220' among the gallery content 1220' including the still images and videos related to 'son' in the gallery content, according to the user's second uttered voice command 1220.

The electronic apparatus 100' may output only the video 1220' corresponding to the node b among the still images and videos included in the gallery content on the screen.

However, the disclosure is not limited thereto, and the electronic apparatus 100' may move the execution screen for the gallery content to a point where the video 1220' corresponding to the node b is located. Hereinafter, an operation for updating and using an artificial intelligence learning model in the processor 130 according to the disclosure will be described in greater detail.

Figure 13:
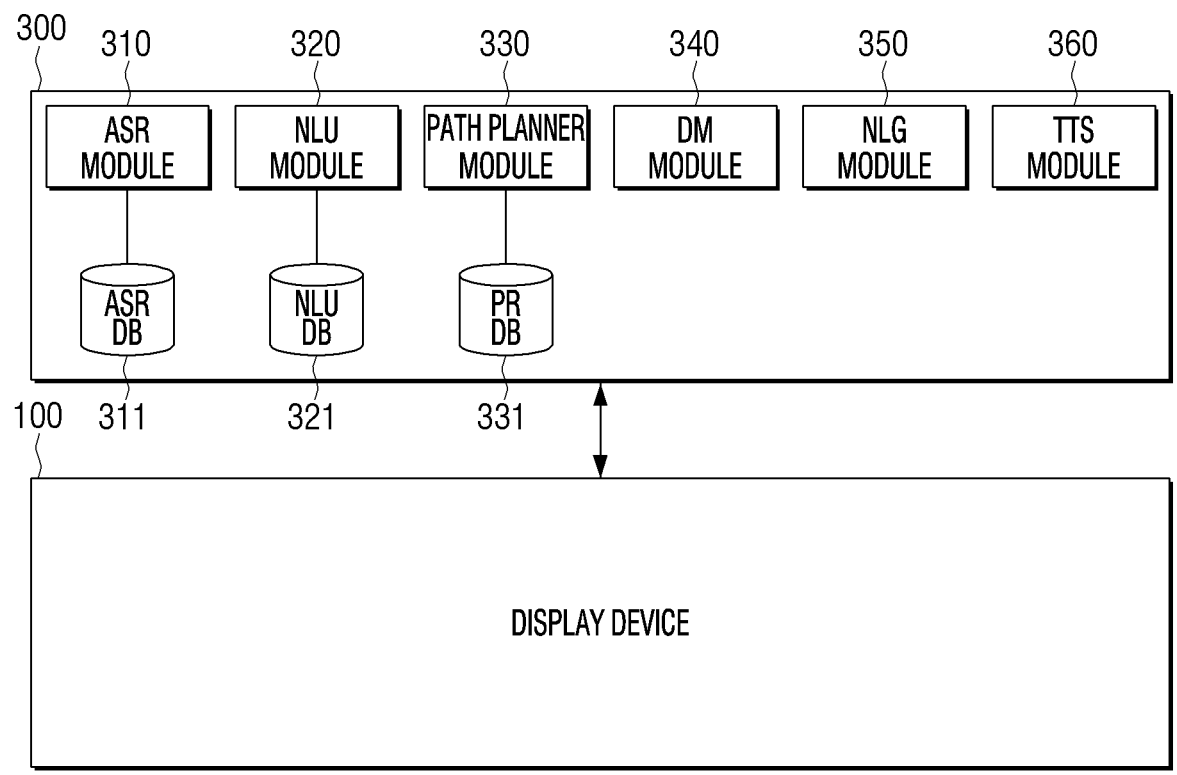
FIG. 13 is a block diagram illustrating an example intelligence server for recognizing an uttered voice command input to an electronic apparatus according to an embodiment of the disclosure.

FIG. 13 is a block diagram illustrating an example intelligence server for recognizing a user uttered voice command input to an electronic apparatus according to an embodiment of the disclosure.

As illustrated in FIG. 13, an intelligence server 300 includes an automatic speech recognition (ASR) module (e.g., including processing circuitry and/or executable program elements) 310, a natural language understanding (NLU) module (e.g., including processing circuitry and/or executable program elements) 320, a path planner module (e.g., including processing circuitry and/or executable program elements) 330, a dialogue manager (DM) module (e.g., including processing circuitry and/or executable program elements) 340, a natural language generator (NLG) module (e.g., including processing circuitry and/or executable program elements) 350, and/or a text to speech (TTS) module (e.g., including processing circuitry and/or executable program elements) 360.

The NLU module 320 or the path planner module 330 of the intelligence server 300 may generate a path rule.

According to an embodiment, an automatic speech recognition (ASR) module 310 may include various processing circuitry and/or executable program elements and translate a user uttered voice command received from the electronic apparatus 100 into text data.

According to an embodiment, the ASR module 310 may translate user uttered voice command received from the electronic apparatus 100 into text data. For example, the ASR module 310 may include an utterance recognition module. The utterance recognition module may include an acoustic model and a language model. For example, the acoustic model may include information related to speech and the language model may include information on unit phoneme information and information on a combination of unit phoneme information. The utterance recognition module may translate a user uttered voice into text data using the information related to speech and the information on the unit phoneme information. Information on the acoustic model and the language model may be stored, for example, in an ASR database (ASR DB) 311.

According to an embodiment, the NLU module 320 may include various processing circuitry and/or executable program elements and comprehend (e.g., determine) a user's intent for utterance by performing a syntactic analysis or a semantic analysis. The syntactic analysis may divide the user uttered voice command into grammatical units (e.g., words, phrases, morphemes, etc.) and grasp what grammatical elements the divided units have. The semantic analysis may be performed using semantic matching, rule matching, formula matching, or the like. The NLU module 320 may acquire a certain domain, an intent, or a parameter (or slot) necessary for representing an intent regarding the user uttered voice command.

According to an embodiment, the NLU module 320 may determine a user's intent for utterance and a parameter using a matching rule divided into a domain, an intent, and a parameter (or slot) necessary for grasping the intent. For example, one domain (e.g., an alarm) may include multiple intents (e.g., alarm setting, alarm release, etc.), and one intent may include a plurality of parameters (e.g., time, number of repetitions, alarm sound, etc.). The plurality of rules may include, for example, one or more essential element parameters. The matching rule may be stored in a NLU DB 321.

According to an embodiment, the NLU module 320 may comprehend a meaning of words extracted from a user uttered voice command using linguistic characteristics (e.g., grammatical elements) such as, for example, and without limitation, morpheme, phrase, and the like, and determine a user's utterance intent by matching the grasped meaning of the words to a domain and an intent. For example, the NLU module 320 may determine the user's utterance intent by calculating how many words extracted from the user uttered voice command are included in each domain and intent.

According to an embodiment, the NLU module 320 may determine a parameter of the user uttered voice command using words that are the basis for grasping the intent. According to an embodiment, the NLU module 320 may determine the user's utterance intent using the NLU DB 321 in which the linguistic characteristics for grasping the user's utterance intent is stored.

In another embodiment, the NLU module 320 may determine a user's utterance intent using a personal language model (PLM). For example, the NLU module 320 may determine the user's utterance intent using personal information (e.g., a contact list, a music list). The PLM may be stored in the NLU DB 321, for example.

According to an embodiment, not only the NLU module 320 but also the ASR 310 may recognize a user's uttered voice command by referring to the PLM stored in the NLU DB 321.

According to an embodiment, the NLU module 320 may generate a path rule based on user's utterance intent and parameters. For example, the NLU module 320 may select an application to be executed based on the user's utterance intent, and determine an operation to be performed in the selected application. The NLU module 320 may generate a path rule by determining a parameter corresponding to the determined operation.

According to an embodiment, the path rule generated by the NLU module 320 may include information on the application to be executed, the operation to be performed in the application, and the parameters necessary to perform the operation.

According to an embodiment, the NLU module 320 may generate one path rule or a plurality of path rules based on user's utterance intent and parameters. For example, the NLU module 320 may receive a path rule set corresponding to the electronic apparatus 100 from the path planner module 330 and maps the user's utterance intent and parameters to the received path rule set to determine a path rule.

According to another embodiment, the NLU module 320 may generate one path rule or a plurality of path rules by determining an application to be executed based on the user's utterance intent and parameters, an operation to be executed in the application, and parameters necessary to execute the operation. For example, the NLU module 320 may generate a path rule by arranging the application to be executed and the operation to be executed in the application using the information of the electronic apparatus 100 in an ontology or graph model form according to the user's utterance intent. The generated path rule may be stored in a path rule database (PR DB) 331 through, for example, the path planner module 330. The generated path rule may be added to the path rule set of the PR DB 331.

According to an embodiment, the NLU module 320 may select at least one path rule among a plurality of the generated path rules. For example, the NLU module 320 may select a plurality of optimal path rules. As another example, the NLU module 320 may select a plurality of path rules if only some operations are specified based on the user uttered voice command. The NLU module 320 may determine one of the plurality of path rules by a user's additional uttered voice command.

According to an embodiment, the NLU module 320 may transmit a path rule to the electronic apparatus 100 according to a request regarding a user uttered voice command. For example, the NLU module 320 may transmit one path rule corresponding to a user uttered voice command to the electronic apparatus 100.

In another example, the NLU module 320 may transmit a plurality of path rules corresponding to a user uttered voice command to the electronic apparatus 100. The plurality of path rules may be generated by the NLU module 320, for example, if only some of the operations are specified based on the user uttered voice command.

According to an embodiment, the path planner module 330 may include various processing circuitry and/or executable program elements and select at least one path rule among the plurality of path rules.

According to an embodiment, the path planner module 330 may transfer a path rule set including a plurality of path rules to the NLU module 320. The plurality of path rules of the path rule set may be stored in a table form in the PR DB 331 connected to the path planner module 330. For example, the path planner module 330 may transfer a path rule set corresponding to information (e.g., OS information, application information) of the electronic apparatus 100 to the NLU module 320. Here, the table stored in the PR DB 331 may be stored for each domain or domain version, for example.

According to an embodiment, the path planner module 330 may select one path rule or a plurality of path rules from the path rule set and transfer the selected path rules to the NLU module 320. For example, the path planner module 330 may match the user's utterance intent and the parameters to the path rule set corresponding to the electronic apparatus 100, select one path rule or a plurality of path rules, and transfer the selected path rules to the NLU module 320.

According to an embodiment, the path planner module 330 may generate one path rule or a plurality of path rules using user's utterance intent and parameters. For example, the path planner module 330 may generate one path rule or a plurality of path rules by determining an application to be executed and an operation to be executed in the application based on the user's utterance intent and the parameters.

According to an embodiment, the path planner module 330 may store the generated path rule in the PR DB 331.

According to an embodiment, the path planner module 330 may store the path rules generated by the NLU module 320 in the PR DB 331. As such, the generated path rule may be added to the path rule set stored in the PR DB 331.

According to an embodiment, the table stored in the PR DB 331 may include a plurality of path rules or a plurality of path rule sets. The plurality of path rules or the plurality of path rule sets may, for example, and without limitation, reflect a kind, version, type, characteristic, or the like, of a device that carries out each path rule.

According to an embodiment, the DM module 340 may include various processing circuitry and/or executable program elements and determine whether the user's utterance intent grasped by the NLU module 320 is clear. For example, the DM module 340 may determine whether the user's utterance intent is clear based on whether the information of the parameters is sufficient. The DM module 340 may determine whether the parameters grasped by the NLU module 320 are sufficient to perform a task.

According to an embodiment, the DM module 340 may perform feedback to request necessary information from the user if the user's utterance intent is not clear. For example, the DM module 340 may perform feedback to request information on a parameter for grasping a user's utterance intent.

According to an embodiment, the DM module 340 may include a multimedia content provider module. When the multimedia content provider module performs an operation based on the intent grasped by the NLU module 320 and the parameters, the multimedia content provider module may generate a result of performing a task corresponding to the user uttered voice command.

According to an embodiment, the DM module 340 may transmit a result generated by the multimedia content provider module to the electronic apparatus 100 as a response to the user's uttered voice command.

According to an embodiment, the NLG module 350 may include various processing circuitry and/or executable program elements and change designated information into a text form. The information changed into the text form may be in the form of a natural language utterance. The designated information may include, for example, information on an additional input, information for guiding completion of an operation corresponding to a user's uttered voice command, or information for guiding a user's additional uttered voice command (e.g., feedback information regarding a user input). The information changed in the form of text may be transmitted to the electronic apparatus 100 and displayed on a display or may be transmitted to the text-to-speech conversion module (TTS module) 360 and changed to a voice form.

According to an embodiment, the TTS module 360 may include various processing circuitry and/or executable program elements and change the information in the text form into the information in a voice form. The TTS module 360 may receive the information in the text form from the NLG module 350, changes the received information in the text form into the information in a voice form, and transmits the information to the electronic apparatus 100. The electronic apparatus 100 may output the transmitted information in the voice form to a speaker.

According to an embodiment, the NLU module 320, the path planner module 330, and the DM module 340 may be implemented as a single module. For example, the NLU module 320, the path planner module 330, and the DM module 340 may be implemented as one module to determine a user's utterance intent and parameters and generate a response (e.g., path rule) corresponding to the determined user's utterance intent and parameters. Accordingly, the generated response may be transmitted to the electronic apparatus 100.

Various embodiments of the disclosure may be implemented by software including an instruction stored in a machine-readable storage media readable by a machine (e.g., a computer). The machine may be a device that calls the stored instruction from the machine-readable storage media and operates depending on the called instruction and may include the electronic device (e.g., the electronic apparatus 100). When the instruction is executed by the processor, the processor may perform a function corresponding to the instruction directly or using other components under the control of the processor. The instruction may include a code generated by a compiler or a code executable by an interpreter. The machine-readable storage media may be provided in the form of non-transitory storage media. The term "non-transitory", as used herein, is a limitation of the medium itself as opposed to a limitation on data storage persistency.

According to various example embodiments, the methods according to various embodiments disclosed in this document may be included in a computer program product and provided. The computer program product may be traded as goods between a seller and a purchaser. The computer program product may be distributed as a device-readable storage medium (e.g., compact disk read only memory (CD-ROM)) or online through an application store (e.g., Play Store™). In the case of online distribution, at least part of the computer program product may be temporarily stored or temporarily generated in a storage medium such as a server of a manufacturer, a server of an application store, or a memory of a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

While various example embodiments have been illustrated and described, it will be understood that the various embodiments are intended to be illustrative, not limiting. One skilled in the art will understand that various changes in form and detail may be made without departing from the true spirit and full scope of the disclosure.

What is claimed is:

1. A method for controlling an electronic apparatus, the method comprising:
    obtaining multimedia content including a plurality of image frames;
    obtaining multimedia content-related information related to the multimedia content, the multimedia content-related information including a plurality of keywords;
    selecting a first image frame and a second image frame each including an object related to the obtained multimedia content-related information from among objects included in the plurality of image frames;
    obtaining first description information for the first image frame, based on the first image frame and the obtained multimedia content-related information, the first description information including first text items associated with objects included in the first image frame and information on a relationship between the first text items;
    obtaining a second description information for the second image frame, based on the second image frame and the obtained multimedia content-related information, the second description information including second text items associated with objects included in the second image frame and information on a relationship between the second text items;
    obtaining third description information for the multimedia content by associating text items commonly included ion the first text items and the second text items;
    receiving a command comprising a scene content request;
    obtaining scene content from the multimedia content by comparing the scene content request to the second description information; and
    outputting the obtained scene content.

2. The method of claim 1, wherein
    the multimedia content-related information includes at least one of electronic program guide (EPG) information related to the multimedia content, web information and social network service (SNS) information related to the multimedia content, or metadata stored in the electronic apparatus in connection with the multimedia content.

3. The method of claim 1, wherein
    the selecting of the first image frame and the second image frame comprises:
    selecting, as the first image frame, an image frame from among the plurality of image frames detected to include a first object related to a first keyword among the plurality of keywords included in the multimedia content-related information,
    detecting that any of a plurality of image frames successively following the first image frame include the first object, and
    selecting, as the second image frame, at least one image frame detected to include the first object from among image frames successively following the first image frame.

4. The method of claim 3, wherein
    the selecting of the first image frame and the second image frame comprises:
    based on the detecting that none of the plurality of image frames successively following the first image frame include the first object, detecting that any of the plurality of image frames successively following the first image frame include a second object related to a second keyword, among the plurality of keywords, and selecting, as the second image frame, at least one frame detected to include the second object from among the image frames successively following the first image frame.

5. The method of claim 1, further comprising:
    inputting a keyword of the plurality of keywords included in the multimedia content-related information and the first image frame of the at least one selected image frame to an artificial intelligence model for object recognition to obtain the first description information for the first image frame, and
    inputting a keyword of the plurality of keywords included in the multimedia content-related information and the second image frame of the at least one selected image frame to the artificial intelligence model to obtain the second description information for the second image frame.

6. The method of claim 5, wherein
    the first description information for the first image frame includes information in a relational graph format representing the first text items describing objects included in the first image frame, and
    the second description information for the second image frame includes information in a relational graph format representing the second text items describing objects include in the second image frame.

7. The method of claim 6, wherein the third description information is obtained by associating related text items included in the first text items and the second text items.

8. The method of claim 1, wherein
    the command includes text and the scene content is obtained by comparing the text included in the command with text included in the third description information.

9. The method of claim 1, wherein
    the selecting of the first image frame and the second image frame comprises:
    analyzing each of the plurality of image frames to select an image frame at a time at which image transition occurs;
    identifying image frames at times at which image transitions occur as representative frames;

identifying, as a key frame, at least one representative frame from among the representative frames, including an object related to a keyword of the plurality of keywords included in the multimedia content-related information; and selecting the at least one image frame from among image frames included in a section of the multimedia content including the key frame.

10. The method of claim 9, wherein
the section of the multimedia content comprises an image frame determined as one of the key frames and an image frame preceding an image frame identified as a representative frame among image frames successively following the key frame.

11. An electronic apparatus comprising:
a processor, the processor configured to control the electronic apparatus to:
  obtain multimedia content including a plurality of image frames and multimedia content-related information related to the multimedia content, the multimedia content-related information including a plurality of keywords,
  select a first image frame and a second image frame each including an object related to the obtained multimedia content-related information from among objects included in the plurality of image frames,
  obtain first description information for the first image frame, based on the first image frame and the obtained multimedia content-related information, the first description information including first text items associated with objects included in the first image frame and information on a relationship between the first text items,
obtaining second description information for the second image frame based on the second image frame and the obtained multimedia content-related information, the second description information including second text items associated with objects included in the second image frame and information on a relationship between the second text items:
obtain third description information for the multimedia content by associating text items commonly included in the first text items and the second text items;
receive a command comprising a scene content request;
obtain scene content from the multimedia content by comparing the scene content request to the second description information; and
output the obtained scene content.

12. The electronic apparatus of claim 11, wherein
the multimedia content-related information comprises at least one of EPG information related to the multimedia content, web information and SNS information related to the multimedia content, or metadata stored in the electronic apparatus in connection with the multimedia content.

13. The electronic apparatus of claim 11, wherein
the processor is configured to control the electronic apparatus to:
select, as the first image frame, an image frame from among the plurality of image frames detected to include a first object related to a first keyword among the plurality of keywords included in the multimedia content-related information,
detect that any of a plurality of image frames successively following the first image frame include the first object, and
select, as the second image frame, at least one image frame detected to include the first object from among image frames successively following the first image frame.

14. The electronic apparatus of claim 13, wherein the processor is configured to control the electronic apparatus to:
based on detecting that none of the plurality of image frame successively following the first image frame include the first object, detect that any of the plurality of image frames successively following the first image frame include a second object related to a second keyword, among the plurality of keywords, and select, as the second image frame, at least one frame detected to include the second object from among the image frames successively following the first image frame.

15. The electronic apparatus of claim 11, wherein the processor is configured to control the electronic apparatus to:
input a keyword included in the multimedia content-related information and the first image frame of the at least one selected image frame to an artificial intelligence model for object recognition to obtain the first description information for the first image frame, and
input a keyword included in the multimedia content-related information and the second image frame of the at least one selected image frame to the artificial intelligence model to obtain the second description information for the second image frame.

16. The electronic apparatus of claim 15, wherein
the first description information for the first image frame includes information in a relational graph format representing the first text items describing objects included in the first image frame, and
the second description information, for the second image frame includes information in a relational graph format representing the second text items describing objects included in the second image frame.

17. The electronic apparatus of claim 16, wherein the third description information is obtained by associating related text items included in the first text items and the second text items.

18. The electronic apparatus of claim 11,
wherein the command includes text and the scene content is obtained by comparing the text included in the command with text included in the third description information.

19. The electronic apparatus of claim 11, wherein the processor is configured to control the electronic apparatus to:
analyze each of the plurality of image frames to select an image frame at a time of the occurrence of image transition,
identify image frames at the times at which image transitions occur as representative frames,
identify, as a key frame, at least one representative frame from among the representative frames, including an object related to a keyword of the plurality of keywords included in the multimedia content-related information, and
select the at least one image frame from among image frames included in a section of multimedia content including the key frame, wherein
the section of the multimedia content includes an image frame determined as one of the key frames and an image frame preceding an image frame identified as a representative frame among image frames successively following the key frame.

20. A non-transitory computer-readable recording medium storing a program which, when executed by a processor of an electronic apparatus, causes the electronic apparatus to perform operations comprising:

obtaining multimedia content including a plurality of image frames;

obtaining multimedia content-related information related to the multimedia content, the multimedia content-related information including a plurality of keywords;

selecting a first image frame and a second image frame each including an object related to the obtained multimedia content-related information from among objects included in the plurality of image frames;

obtaining first description information for the first image frame, based on the first image frame and the obtained multimedia content-related information, the first description information including first text items associated with objects included in the first image frame and information on a relationship between the first text items;

obtaining a second description information for the second image frame, based on the second image frame and the obtained multimedia content-related information, the second description information including second text items associated with objects included in the second image frame and information on a relationship between the second text items;

obtaining third description information for the multimedia content by associating text items commonly included in the first text items and the second text items;

receiving a command comprising a scene content request;

obtaining scene content from the multimedia content by comparing the scene content request to the second description information; and outputting the obtained scene content.

\* \* \* \* \*